US012632478B1

(12) United States Patent
Vu et al.

(10) Patent No.: US 12,632,478 B1
(45) Date of Patent: May 19, 2026

(54) NATURAL LANGUAGE QUESTION ANSWERING

(71) Applicant: Amazon Technologies, Inc., Seattle, WA (US)

(72) Inventors: Thuy Vu, Torrance, CA (US); Kishan K C, Santa Clara, CA (US); Toan Quoc Nguyen, Columbia, MO (US); Ankit Chadha, San Jose, CA (US); Van Minh Nguyen, Eugene, OR (US); Zeyu Zhang, Tucson, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 18/465,695

(22) Filed: Sep. 12, 2023

Related U.S. Application Data

(60) Provisional application No. 63/509,117, filed on Jun. 20, 2023.

(51) Int. Cl.
G06F 16/3329 (2025.01)

(52) U.S. Cl.
CPC .............................. G06F 16/3329 (2019.01)

(58) Field of Classification Search
None
See application file for complete search history.

(56) References Cited

U.S. PATENT DOCUMENTS

| | | | |
|---|---|---|---|
| 2023/0074406 A1* | 3/2023 | Baeuml | G06F 16/90332 |
| 2023/0297326 A1* | 9/2023 | Miyata | G06F 3/165 |
| 2024/0265281 A1* | 8/2024 | Hart | G06F 40/58 |
| 2024/0320268 A1* | 9/2024 | Mallipeddi | G06F 16/9038 |

OTHER PUBLICATIONS

Shannon, C. E. "A Mathematical Theory of Communication," reprinted with corrections from The Bell System Technical Journal, vol. 27, Issue 3, pp. 379-423, 623-656, Jul. Oct. 1948.
Shuster, Kurt, et al. "Retrieval Augmentation Reduces Hallucination in Conversation." In Findings of the Association for Computational Linguistics: EMNLP 2021, pp. 3784-3803. Association for Computational Linguistics.

(Continued)

*Primary Examiner* — Quynh H Nguyen
(74) *Attorney, Agent, or Firm* — Pierce Atwood LLP

(57) ABSTRACT

Techniques for finetuning a large language model (LLM) are described. The finetuned LLM is generated by sequentially tuning a trained LLM using: (i) pairs of questions and corresponding context received from at least one source different from the trained LLM; and (ii) the questions without the context. The finetuned LLM may be used to generate an answer to a question, and user feedback and context may be used to update a trained machine learning (ML) configured to determine context for input to the finetuned LLM at inference. The updated trained ML model may thereafter process a question to determine context usable to answer the question; the question and the context may be processed by the finetuned LLM to determine an answer to the question; and the question, context, and answer may be used to further finetune the LLM.

20 Claims, 10 Drawing Sheets

(56)        References Cited

OTHER PUBLICATIONS

Sinkhorn, Richard Dennis, and Knopp, Paul Joseph. "Concerning Nonnegative Matrices and Doubly Stochastic Matrices." In Pacific Journal of Mathematics, vol. 21, No. 2, (Dec. 1967), pp. 343-348. Retrieved from https://msp.org/pjm/1967/21-2/pjm-v21-n2-p14-s. pdf.

Soltan, Saleh, et al. "AlexaTM 20B: Few-Shot Learning Using a Large-Scale Multilingual Seq2seq Model." (2022). Retrieved from https://www.amazon.science/publications/alexatm-20b-few-shot-learning-using-a-large-scale-multilingual-seq2seq-model.

Vaswani, Ashish et al. "Attention is All you Need." 31st Conference on Neural Information Processing Systems (NIPS 2017). In Advances in Neural Information Processing Systems, vol. 30, (2017), 11 pages.

Wang, Chaojun and Sennrich, Rico. "On Exposure Bias, Hallucination and Domain Shift in Neural Machine Translation." In Proceedings of the 58th Annual Meeting of the Association for Computational Linguistics, (2020), pp. 3544-3552, Online.

Wang, Wenhui, et al. "Gated Self-Matching Networks for Reading Comprehension and Question Answering." In Proceedings of the 55th Annual Meeting of the Association for Computational Linguistics (vol. 1: Long Papers), (2017), pp. 189-198.

Wang, Yizhong, et al. "Super-NaturalInstructions: Generalization via Declarative Instructions on 1600+ NLP Tasks." In Proceedings of the 2022 Conference on Empirical Methods in Natural Language Processing, (2022), pp. 5085-5109. Association for Computational Linguistics.

Wei, Jason, et al. "Emergent Abilities of Large Language Models." In Transactions on Machine Learning Research, (Aug. 2022), 30 pages. Retrieved from https://openreview.net/pdf?id=yzkSU5zdwD.

Weston, Jason, et al. "Towards AI-Complete Question Answering: A Set of Prerequisite Toy Tasks." arXiv preprint arXiv:1502. 05698v10, Dec. 31, 2015.

Wiseman, Sam and Rush, Alexander M. "Sequence-to-Sequence Learning as Beam-Search Optimization." In Proceedings of the 2016 Conference on Empirical Methods in Natural Language Processing, (2016), pp. 1296-1306. Association for Computational Linguistics.

Xiao, Yijun and Wang, William Yang. "On Hallucination and Predictive Uncertainty in Conditional Language Generation." In Proceedings of the 16th Conference of the European Chapter of the Association for Computational Linguistics: Main Volume, (2021), pp. 2734-2744, Online.

Xu, Jingjing, et al. "Asking Clarification Questions in Knowledge-Based Question Answering." In Proceedings of the 2019 Conference on Empirical Methods in Natural Language Processing and the 9th International Joint Conference on Natural Language Processing (EMNLP-IJCNLP), (2019), pp. 1618-1629. Association for Computational Linguistics.

Yan, Hang, et al. "A unified generative framework for various NER subtasks." In Proceedings of the 59th Annual Meeting of the Association for Computational Linguistics and the 11th International Joint Conference on Natural Language Processing (vol. 1: Long Papers), (2021), pp. 5808-5822, Online.

Yang, Wei, et al. "End-to-End Open-Domain Question Answering with BERTserini." In Proceedings of the 2019 Conference of the North American Chapter of the Association for Computational Linguistics (Demonstrations), (2019), pp. 72-77.

Yang, Yi, et al. "WikiQA: A Challenge Dataset for Open-Domain Question Answering." In Proceedings of the 2015 Conference on Empirical Methods in Natural Language Processing, (2015), pp. 2013-2018. Association for Computational Linguistics.

Yoon, Seunghyun, et al. "A Compare-Aggregate Model with Latent Clustering for Answer Selection." In Proceedings of the 28th ACM International Conference on Information and Knowledge Management, (2019), 5 pages. arXiv preprint arXiv:1905.12897.v2, Aug. 23, 2019.

Zhang, Jingqing, et al. "PEGASUS: Pre-training with Extracted Gap-sentences for Abstractive Summarizaton." In Proceedings of the 37th International Conference on Machine Learning, PMLR 119, (2020), 55 pages. Retrieved from arXiv preprint arXiv:1912. 08777v3, Jul. 10, 2020.

Zhang, Tianyi, et al. "BERTScore: Evaluating Text Generation With Bert." Published as a conference paper at International Conference on Learning Representations (2020), 43 pages. Retrieved from https://openreview.net/forum?id=SkeHuCVFDr.

Zhang, Zeyu, et al. "WDRASS: A Web-scale Dataset for Document Retrieval and Answer Sentence Selection." In Proceedings of the 31st ACM International Conference on Information and Knowledge Management, (2022), pp. 4707-4711.

Zhao, Zheng, et al. "Reducing Quantity Hallucinations in Abstractive Summarization." In Findings of the Association for Computational Linguistics: EMNLP 2020, pp. 2237-2249. Association for Computational Linguistics.

Zhou, Chunting, et al. "Detecting Hallucinated Content in Conditional Neural Sequence Generation." In Findings of the Association for Computational Linguistics: ACL-IJCNL 2021, pp. 1393-1404.

Kasai, Jungo, et al. "Realtime QA: What's the Answer Right Now?" arXiv preprint arXiv:2207.13332v1, Jul. 27, 2022, 13 pages.

Lazaridou, Angeliki, et al. "Mind the Gap: Assessing Temporal Generalization in Neural Language Models." 35th Conference on Neural Information Processing Systems. In Advances in Neural Information Processing Systems, vol. 34, (2021), 16 pages.

Lin, Stephanie, et al. "TruthfulQA: Measuring How Models Mimic Human Falsehoods." In Proceedings of the 60th Annual Meeting of the Association for Computational Linguistics (vol. 1: Long Papers), (2022), pp. 3214-3252.

Ouyang, Long, et al. "Training language models to follow instructions with human feedback." 36th Conference on Neural Information Processing Systems, (NeurIPS 2022). In Advances in Neural Information Processing Systems, vol. 35, (2022), 15 pages.

Prager, John. "Open-Domain Question-Answering." In Foundations and Trends in Information Retrieval, vol. 1, Issue 2, (2006), pp. 91-231. Retrieved from https://dx.doi.org/10.1561/1500000001.

Schulman, John, et al. "Proximal Policy Optimization Algorithms." arXiv preprint arXiv:1707.06347v2, Aug. 28, 2017.

Stiennon, Nisan, et al. "Learning to summarize from human feedback." 34th Conference on Neural Information Processing Systems. In Advances in Neural Information Processing Systems, vol. 33, (2020), 14 pages.

Wei, Jason, et al. "Finetuned Language Models are Zero-Shot Learners." Published as a conference paper in The International Conference on Learning Representations. Retrieved from arXiv preprint arXiv:2109.01652v5, Feb. 8, 2022, 46 pages.

Zielger, Daniel M., et al. "Fine-Tuning Language Models from Human Preferences." arXiv preprint arXiv:1909.08593v2, Jan. 8, 2020.

Bai, Yuntao, et al. "Training a Helpful and Harmless Assistant with Reinforcement Learning from Human Feedback," arXiv preprint arXiv:2204.05862v1, Apr. 12, 2022.

Bao, Junwei, et al. "Constraint-Based Question Answering with Knowledge Graph." In Proceedings of COLING 2016, he 26th International Conference on Computational Linguistics: Technical Papers, (2016), pp. 2503-2514.

Bao, Junwei, et al. "Knowledge-Based Question Answering as Machine Translation." In Proceedings of the 52nd Annual Meeting of the Association for Computational Linguistics, (2014), pp. 967-976.

Belghazi, Mohamed Ishmael, et al. "Mutual Information Neural Estimation." In Proceedings of the 35th International Conference on Machine Learning, PMLR 80, (2018), pp. 531-540.

Callison-Burch, Chris, et al. "Re-evaluating the Role of BLEU in Machine Translation Research." In 11th Conference of the European Chapter of the Association for Computational Linguistics, (2006), pp. 249-256.

Chen, Danqi, et al. "Reading Wikipedia to Answer Open-Domain Questions." arXiv preprint arXiv:1704.00051v2, Apr. 28, 2017, 10 pages.

(56) References Cited

OTHER PUBLICATIONS

Chen, Danqi, & Yih, Wen-Tau. "Open-Domain Question Answering." In Proceedings of the 58th Annual Meeting of the Association for Computational Linguistics: Tutorial Abstracts, (2020), pp. 34-37, Online.

Clark, Peter, et al. "Combining Retrieval, Statistics, and Inference to Answer Elementary Science Questions." In Proceedings of the Thirtieth AAAI Conference on Artificial Intelligence, (Mar. 2016), vol. 30, No. 1, 7 pages.

Cuturi, Marco. "Sinkhorn Distances: Lightspeed Computation of Optimal Transport." In Advances in Neural Information Processing Systems, (2013), vol. 26, 9 pages.

Devlin, Jacob, et al. "BERT: Pre-training of Deep Bidirectional Transformers for Language Understanding." In Proceedings of the 2019 Conference of the North American Chapter of the Association for Computational Linguistics: Human Language Technologies, (2019), vol. 1 (Long and Short Papers), pp. 4171-4186.

Fitzgerald, Jack, et al. "Alexa Teacher Model: Pretraining and Distilling Multi-Billion-Parameter Encoders for Natural Language Understanding Systems." In Proceedings of the 28th ACM SIGKDD Conference on Knowledge Discovery and Data Mining (KDD '22). arXiv preprint arXiv:2206.07808v1, Jun. 15, 2022.

Gabburo, Matteo, et al. "Knowledge Transfer from Answer Ranking to Answer Generation." In Proceedings of the 2022 Conference on Empirical Methods in Natural Language Processing, (2022), pp. 9481-9495.

Garg, Siddhant, et al. "TANDA: Transfer and Adapt Pre-Trained Transformer Models for Answer Sentence Selection." In the Thirty-Fourth AAAI Conference on Artificial Intelligence, (2020), pp. 7780-7788.

Gururangan, Suchin, et al. "Don't Stop Pretraining: Adapt Language Models to Domains and Tasks." In Proceedings of the 58th Annual Meeting of the Association for Computational Linguistics, (2020), pp. 8342-8360, Online.

Hermann, Karl Mortiz, et al. "Teaching Machines to Read and Comprehend." In Advances in Neural Information Processing Systems, vol. 28, (2015), 9 pages.

Hjelm, R. Devon, et al. "Learning Deep Representations by Mutual Information Estimation and Maximization." Published as a conference paper at ICLR 2019, arXiv preprint arXiv:1808.06670v5, Feb. 22, 2019.

Howard, Jeremy, & Ruder, Sebastian. "Universal Language Model Fine-tuning for Text Classification." In Proceedings of the 56th Annual Meeting of the Association for Computational Linguistics (vol. 1: Long Papers), (2018), pp. 328-339.

Hsu, Chao-Chun, et al. "Answer Generation for Retrieval-based Question Answering Systems." In Findings of the Association for Computational Linguistics: ACL-IJCNLP (2021), pp. 4276-4282.

Izacard, Gautier, & Grave, Edouard. "Leveraging Passage Retrieval with Generative Models for Open Domain Question Answering." In Proceedings of the 16th Conference of the European Chapter of the Association for Computational Linguistics, (2021), pp. 874-880.

Ji, Ziwei, et al. "Survey of Hallucination in Natural Language Generation." In ACM Computing Surveys, vol. 55, Issue 12, Article No. 248, (Mar. 2023) pp. 1-38.

Jiang, Zhengbao et al. "Understanding and Improving Zero-shot Multi-hop Reasoning in Generative Question Answering." In Proceedings of the 29th International Conference on Computational Linguistics, (2022), pp. 1765-1775.

Kaplan, Jared, et al. "Scaling Laws for Neural Language Models." arXiv preprint arXiv:2001.08361v1, Jan. 23, 2020, 30 pages.

Karpukhin, Vladimir, et al. "Dense Passage Retrieval for Open-Domain Question Answering." In Proceedings of the 2020 Conference on Empirical Methods in Natural Language Processing (EMNLP), (2020), pp. 6769-6781, Online. Association for Computational Linguistics.

Khashabi, Daniel, et al. "UNIFIEDQA: Crossing Format Boundaries with a Single QA system." In Findings of the Association for Computational Linguistics: EMNLP 2020, pp. 1896-1907, Online.

Kipf, Thomas N., & Welling, Max. "Semi-Supervised Classification with Graph Convolutional Networks." Published as conference paper at ICLR 2017, 14 pages. arXiv preprint arXiv:1609.02907v4, Feb. 22, 2017.

Auriola, Ivano, & Moschitti, Allessandro. "Answer Sentence Selection using Local and Global Context in Transformer Models," (2021), 15 pages. Retrieved from https://www.amazon.science/publications/answer-sentence-selection-using-local-and-global-context-in-transformer-models.

Lewis, Mike, & Fan, Angela. "Generative Question Answering: Learning to Answer the Whole Question," Published as a conference paper at ICLR 2019, 14 pages. Retrieved from https://openreview.net/pdf?id=Bkx0RjA9tX.

Lewis, Mike, et al. "BART: Denoising Sequence-to-Sequence Pre-training for Natural Language Generation, Translation, and Comprehension." In Proceedings of the 58th Annual Meeting of the Association for Computational Linguistics, (2020), pp. 7871-7880, Online.

Lin, Boda, et al. "Dependency Parsing via Sequence Generation." In Findings of the Association for Computational Linguistics: EMNLP 2022, pp. 7368-7382. Association for Computational Linguistics.

Lin, Chin-Yew. "ROUGE: A Package for Automatic Evaluation of Summaries." In Text Summarization Branches Out, (2004) pp. 74-81. Retrieved from https://aclanthology.org/W04-1013.

Liu, Jian, et al. "Event Extraction as Machine Reading Comprehension." In Proceedings of the 2020 Conference on Empirical Methods in Natural Language Processing (EMNLP), (2020), pp. 1641-1651. Association for Computational Linguistics.

Liu, Yinhan, et al. "ROBERTa: A Robustly Optimized BERT Pretraining Approach." arXiv preprint arXiv:1907.11692v1, Jul. 29, 2019, 13 pages.

Lu, Yaojie, et al. "Text2Event: Controllable Sequence-to-Structure Generation for End-to-end Event Extraction." In Proceedings of the 59th Annual Meeting of the Association for Computational Linguistics and the 11th International Joint Conference on Natural Language Processing (vol. 1: Long Papers), (2021), pp. 2795-2806.

Maynez, Joshua, et al. "On Faithfulness and Factuality in Abstractive Summarization." In Proceedings of the 58th Annual Meeting of the Association for Computational Linguistics, (2020), pp. 1906-1919, Online.

Muller, Benjamin, et al. "Cross-Lingual Open-Domain Question Answering with Answer Sentence Generation." In Proceedings of the 2nd Conference of the Asia-Pacific Chapter of the Association for Computational Linguistics and the 12th International Joint Conference on Natural Language Processing, (vol. 1: Long Papers), (2022), pp. 337-353, Online only.

Nakano, Reiichiro, et al. "Webgpt: Browser-assisted question-answering with human feedback." arXiv preprint arXiv:2112.09332v3, Jun. 1, 2022, 32 pages.

Nguyen, Tri, et al. "MS MARCO: A Human Generated MAchine Reading Comprehension Dataset." 30th Conference on Neural Information Processing Systems (NIPS 2016). arXiv preprint arXiv:1611.09268v1, Nov. 28, 2016, 10 bages.

Papineni, Kishore, et al. "BLEU: a Method for Automatic Evaluation of Machine Translation." In Proceedings of the 40th Annual Meeting of the Association for Computational Linguistics (ACL), Jul. 2022, pp. 311-318.

Peters, Matthew E., et al. "Deep contextualized word representations." In Proceedings of the 2018 Conference of the North American Chapter of the Association for Computational Linguistics: Human Language Technologies, vol. 1 (Long Papers), (2018), pp. 2227-2237.

Radford, Alec, et al. "Improving Language Understanding by Generative Pre-Training." OpenAI blog, Jun. 11, 2018, 12 pages. Preprint retrieved from https://openai.com/research/language-unsupervised.

Radford, Alec, et al. "Language Models are Unsupervised Multitask Learners." (2019). Retrieved via https://insightcivic.s3.us-east-1.amazonaws.com/language-models.pdf, 24 pages.

Raffel, Colin, et al. "Exploring the Limits of Transfer Learning with a Unified Text-to-Text Transformer." In Journal of Machine Learning Research, vol. 21, (2020), pp. 1-67.

(56) References Cited

OTHER PUBLICATIONS

Rajpurkar, Pranav, et al. "SQuAD: 100,000+ Questions for Machine Comprehension of Text." In Proceedings of the 2016 Conference on Empirical Methods in Natural Language Processing, (2016), pp. 2383-2392. Association for Computational Linguistics.

Raunak, Vikas, et al. "The Curious Case of Hallucinations in Neural Machine Translation." In Proceedings of the 2021 Conference of the North American Chapter of the Association for Computational Linguistics: Human Language Technologies, (2021), pp. 1172-1183.

Rebuffel, Clement, et al. "Controlling hallucinations at word level in data-to-text generation." In Data Mining and Knowledge Discovery, vol. 36, pp. 318-354 (2022). Springer. https://doi.org/10.1007/s10618-021-00801-4.

Richardson, Matthew, et al. "MCTest: A Challenge Dataset for the Open-Domain Machine Comprehension of Text." In Proceedings of the 2013 Conference on Empirical Methods in Natural Language Processing, (2013), pp. 193-203. Association for Computational Linguistics.

Roberts, Adam, et al. "How Much Knowledge Can You Pack Into the Parameters of a Language Model?" In Proceedings of the 2020 Conference on Empirical Methods in Natural Language Processing, (2020), pp. 5418-5426. Association for Computational Linguistics.

Roller, Stephen, et al. "Recipes for Building an Open-Domain Chatbot." In Proceedings of the 16th Conference of the European Chapter of the Association for Computational Linguistics: Main Volume, (2021), pp. 300-325, Online.

Saxena, Apoorv, et al. "Question Answering Over Temporal Knowledge Graphs." In Proceedings of the 59th Annual Meeting of the Association for Computational Linguistics and the 11th International Joint Conference on Natural Language Processing, (2021), Long papers, pp. 6663-6676. https://aclanthology.org/2021.acl-long.520.pdf.

Severyn, Aliaksei, & Moschitti, Allessandro. "Learning to Rank Short Text Pairs with Convolutional Deep Neural Networks." In Proceedings of the 38th International ACM SIGIR Conference on Research and Development in Information Retrieval, (2015), pp. 373-382. Retrieved from https://citeseerx.ist.psu.edu/document?repid=rep1&type=pdf&doi=84d2e6eb7772e2fa4fc0b14c28446d00370a45d2.

* cited by examiner

Figure 7:
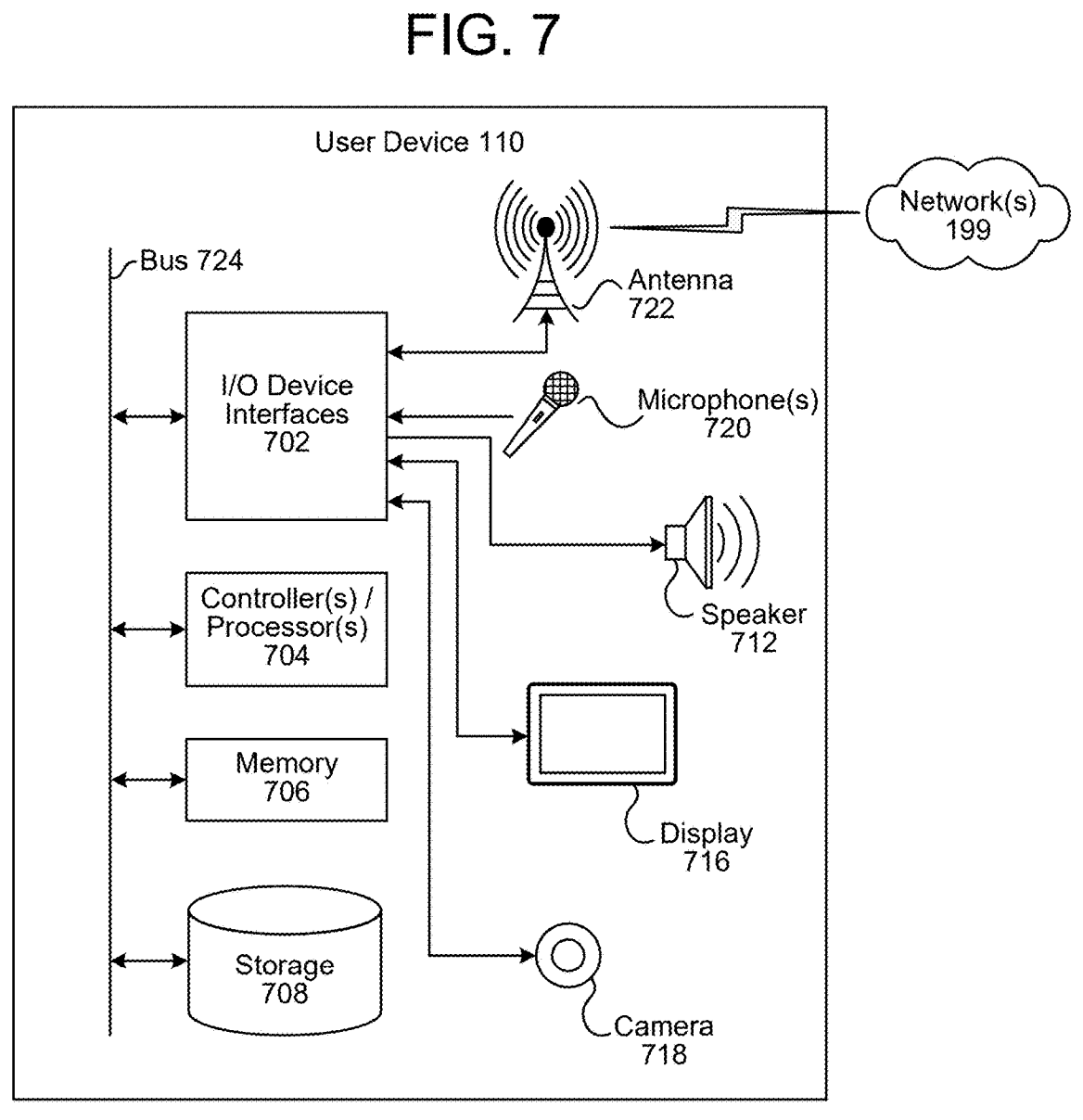

Network(s)
199

User Device 110

Antenna
722

Microphone(s)
720

Speaker
712

Display
716

Camera
718

Bus 724

I/O Device
Interfaces
702

Controller(s) /
Processor(s)
704

Memory
706

Storage
708

FIG. 8

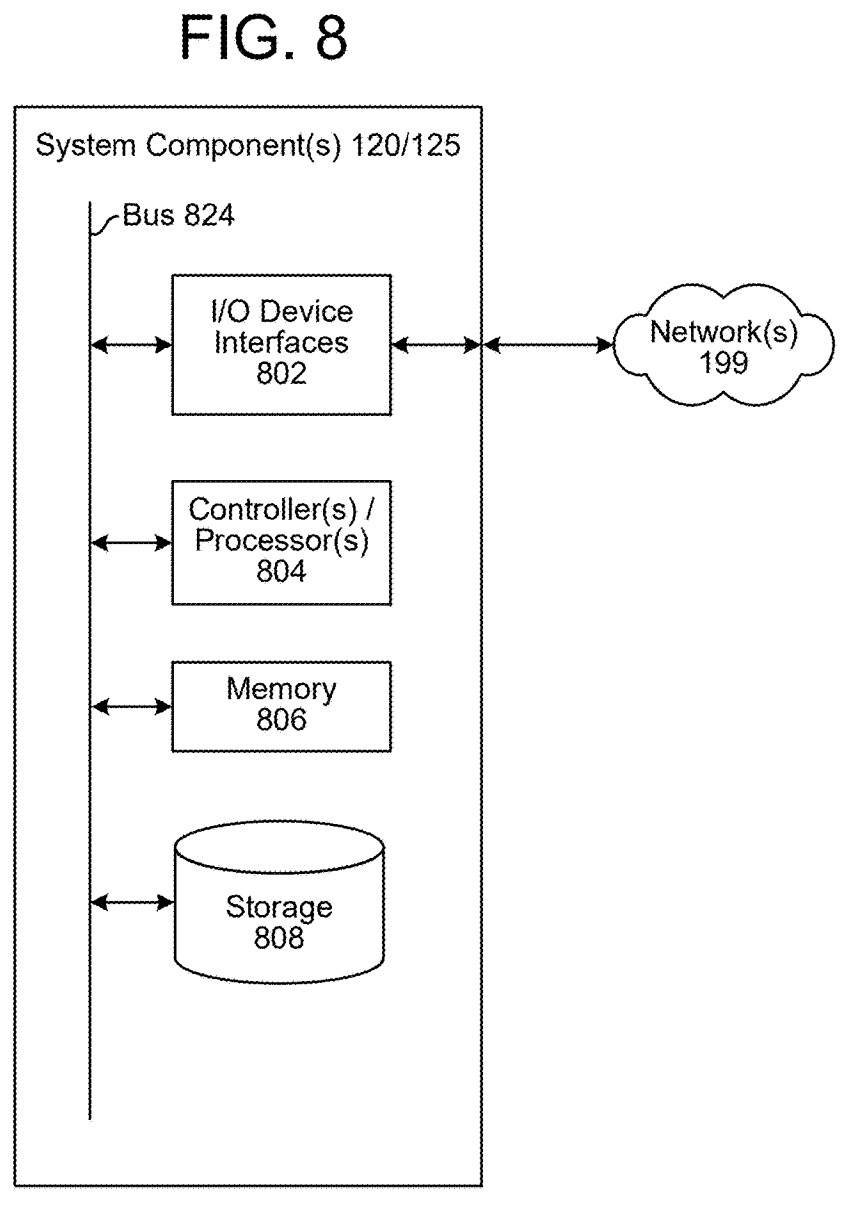

System Component(s) 120/125

Network(s) 199

I/O Device Interfaces 802

Controller(s) / Processor(s) 804

Memory 806

Storage 808

Bus 824

Skill System Component(s) 125

Headphones 110m/110n

Microwave 110j

Refrigerator 110i

Washer/ Dryer 110h

Smart TV 110g

Tablet Computer 110d

Mobile Device 110k

System Component(s) 120

Network(s) 199

Vehicle 110e

Smart Phone 110b

Smart Watch 110c

Speech-Detection Device(s) with Display 110f

Speech-Detection Device(s) 110a

NATURAL LANGUAGE QUESTION ANSWERING

CROSS-REFERENCE TO RELATED APPLICATION

This application claims priority under 35 U.S.C. § 119 to U.S. Provisional Patent Application No. 63/509,117, filed Jun. 20, 2023 and titled "NATURAL LANGUAGE QUESTION ANSWERING," the content of which is incorporated herein by reference in its entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 is a conceptual diagram illustrating optional optimization of the finetuned LLM using proximal policy optimization, according to embodiments of the present disclosure.

FIG. 7 is a block diagram conceptually illustrating example components of a user device, according to embodiments of the present disclosure.

FIG. 8 is a block diagram conceptually illustrating example components of a system component, according to embodiments of the present disclosure.

DETAILED DESCRIPTION

Figure 1:
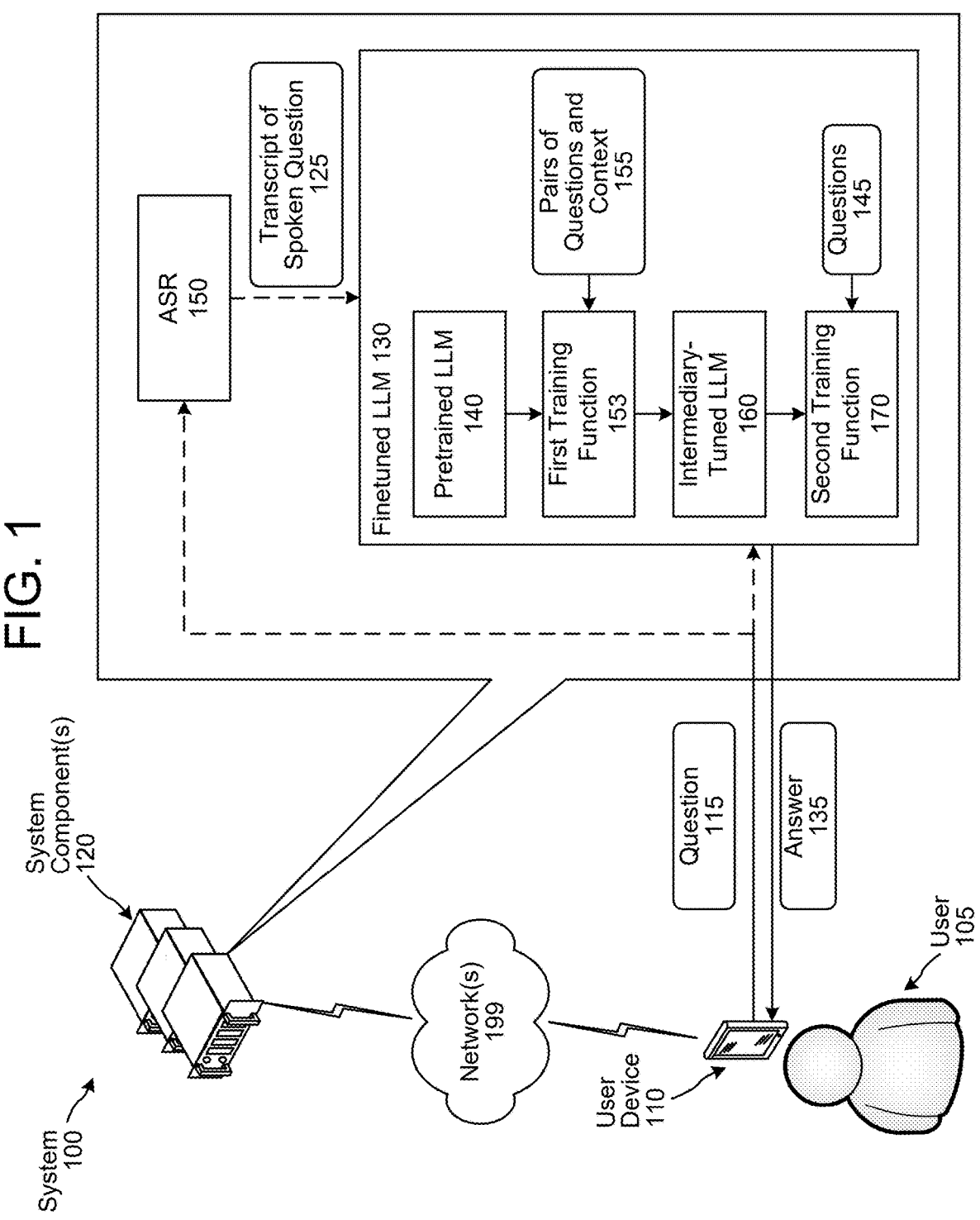
FIG. 1 is a conceptual diagram illustrating a multi-step finetuning of a large language model (LLM) and answering of a question using the finetuned LLM, according to embodiments of the present disclosure.

General question answering (QA) in open domain, a natural language processing (NLP) task, aims to accurately respond to a wide range of questions. Some systems have integrated QA techniques, allowing them to understand and generate responses in natural languages. Some supervised learning techniques may struggle to align system output with user intent. For example, users may expect a very concise answer to "is it going to rain tomorrow" yet may prefer a comprehensive response to "tell me about the raining season in [location]." Some systems use reinforcement learning from human feedback instead of supervised learning, thus utilizing human preference annotations to train a reward model for guiding the learning process of a system with Proximal Policy Optimization (PPO). However, issues may arise with the foregoing, in which the reward model is trained to give preference for any pair of model responses, which is bad for cases where both the responses are factually incorrect and none of them should be preferred by a human annotator. In addition, some systems collect human preference annotations only on model outputs, which could lead to a bottleneck in the development process. This becomes more severe in the case of open domain QA, where human annotators should possess sufficient domain knowledge to fact-check the model responses for given questions to provide correct preference annotations.

To address at least the aforementioned shortcomings, the present disclosure provides a reinforcement learning from human feedback system, namely a Feedback-based Learning for Knowledge-aware Answer Generation (FLAG) system for open domain QA. The system of the present disclosure includes a knowledge retriever and a finetuned LLM.

The knowledge retriever, in some embodiments, is trained on one or more answer sentence selection (AS2) datasets, where candidate sentences are considered as good answers by human experts only if they are factually correct, natural sounding, and direct to the question. Specifically, given a question and an answer candidate, the knowledge retriever may consider previous and next sentences with respect to the candidate, and perform context alignments from the question to each sentence for identifying relevant information. The aligned semantic representations of the sentences, along with their transportation costs to the question, may be utilized to compute weights among the sentences, representing a dependency graph among them. In some embodiments, a neural network (e.g., a Graph Convolutional Network) may be employed to exploit the dependency graph to enhance the answer candidate representation that will be used to determine the correctness (e.g., an AS2 score) of the candidate for the question. Consequently, answer sentence candidates can be ranked via their correctness (e.g., their AS2 scores) to obtain top relevant facts for the question, based on which the finetuned LLM may produce a final response.

The finetuned LLM of the present disclosure may be generated from a pretrained (e.g., encoder-decoder) LLM. The finetuned LLM may be generated by training the pretrained LLM using a two-step supervised finetuning method for open domain QA. The first step may utilize the training function $a=f_\theta(q, c)$, where $f_\theta$ denotes the LLM with the parameters $\theta$, q denotes a question q, and c denotes a context relevant for answering the question q. Once the first step is done, the LLM may be further trained using only the question q. The second finetuning step intentionally excludes the context c from to encourage the LLM to leverage its own parametric knowledge from the model parameters $\theta$, which have been pretrained on unlabeled text, to produce an answer. This training methodology is different from and an improvement over known systems, which usually combine all the data sources together to train an initial model for reinforcement learning from human feedback, which could lead to suboptimal performance for open domain QA due to the unbalanced distribution of different categories of data.

A correctness value (e.g., AS2 score) produced by knowledge retriever can represent the human judgment for an answer sentence, enabling the knowledge retriever of the present disclosure to serve as a reward model. In other words, the knowledge retriever can compute a reward score for any response, produced by the finetuned LLM, to update the finetuned LLM. With the updated finetuned LLM, a system of the present disclosure can sample responses from the model for human annotators to obtain more data, which can be combined with the existing AS2 data, to train the reward model/knowledge retriever. As the reinforcement learning from human feedback training loop continues, a system of the present disclosure for open domain QA can benefit from the double advantage of: (i) the knowledge retriever becoming better at providing higher-quality input with more relevant facts; and (ii) better reward signals from the knowledge retriever being given to the PPO for directly improving the finetuned LLM.

In summary, the present disclosure provides, among other things: (i) a knowledge retriever for answer sentence selection in open domain QA; (ii) a supervised two-step finetuning method to obtain a finetuned LLM for open domain QA; and (iii) a reinforcement learning from human feedback system for open domain QA including the knowledge retriever and the finetuned LLM, in which an AS2 model may serve as both a knowledge retriever and a reward model for training of the finetuned LLM.

Teachings of the present disclosure provide, among other things, an improved user experience by enabling a system to better perform QA in an open domain context.

A first aspect of the present disclosure relates to a computer-implement method including (and a system configured to) receiving a first question; using a trained model configured to determine context data usable to answer questions, determining first context data usable to answer the first question, wherein the trained model determines the first context data using at least one of a knowledge base and web searching; using a first finetuned large language model (LLM), processing the first question and the first context data to determine a first answer to the first question, wherein the first finetuned LLM is configured by: receiving a trained LLM; generating an intermediary-tuned LLM by training the trained LLM using pairs of questions and corresponding context data; and generating the first finetuned LLM by training the intermediary-tuned LLM using the questions without the corresponding context data, thereby configuring the first finetuned LLM to use model parameters to produce answers to questions when context data is unavailable; and outputting the first answer.

In some embodiments of the first aspect, the computer-implement method further includes (and the system is configured to) receiving a second question; using the first finetuned LLM, processing the second question to determine a second answer to the second question; receiving user feedback indicating a correctness of the second answer; and generating the trained model using the second answer and the user feedback.

In some embodiments of the first aspect, the computer-implement method further includes (and the system is configured to) receiving a third question; using the trained model, determining second context data usable to answer the third question, wherein the trained model determines the second context data using at least one of the knowledge base or web searching; using the first finetuned LLM, processing the third question and the second context data to determine a third answer to the third question; and using the third question, the second context data, and the third answer, generating a second finetuned LLM corresponding to an updated version of the first finetuned LLM.

In some embodiments of the first aspect, the computer-implement method further includes (and the system is configured to) using a reward model to generate the second finetuned LLM, wherein the reward model includes a term that penalizes divergence between the trained model and the first finetuned LLM.

A second aspect of the present disclosure relates to a computer-implement method including (and a system configured to) receiving a first question; using a first finetuned large language model (LLM), processing the first question to determine a first answer to the first question, wherein the first finetuned LLM is configured by: receiving a trained LLM; generating an intermediary-tuned LLM by training the trained LLM using pairs of questions and corresponding context data; and generating the first finetuned LLM by training the intermediary-tuned LLM using the questions without the corresponding context data; and outputting the first answer.

In some embodiments of the second aspect, the computer-implement method further includes (and the system is configured to) using a trained model configured to determine context data usable to answer questions, determining first context data usable to answer the first question, wherein the trained model determines the first context data using at least one source different from the trained LLM; and using the first finetuned LLM, further processing the first context data to determine the first answer.

In some embodiments of the second aspect, the at least one source different from the trained LLM comprises at least one of a knowledge base and web searching.

In some embodiments of the second aspect, the computer-implement method further includes (and the system is configured to) receiving a second question; using the first finetuned LLM, processing the second question to determine a second answer to the second question; receiving user feedback indicating a correctness of the second answer; and generating the trained model using the second answer and the user feedback.

In some embodiments of the second aspect, the computer-implement method further includes (and the system is configured to) receiving a second question; using the trained model, determining second context data usable to answer the second question; using the first finetuned LLM, processing the second question and the second context data to determine a second answer to the second question; and using the second question, the second context data, and the second answer, generating a second finetuned LLM corresponding to an updated version of the first finetuned LLM.

In some embodiments of the second aspect, the computer-implement method further includes (and the system is configured to) using a reward model to generate the second finetuned LLM, wherein the reward model includes a term that penalizes divergence between the trained model and the first finetuned LLM.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates the multi-step finetuning of a LLM and answering of a question using the finetuned LLM, according to various embodiments of the present disclosure. As shown in FIG. 1, a system 100 may include a user device 110, local to a user 105, in communication with a system component(s) 120 via a network(s) 199.

The user 105 may provide a natural language question to the user device 110. In some situations, the user 105 may provide the question in the form of an utterance (i.e., a spoken natural language user input). In other situations, the user 105 may provide the question in the form of a typed natural language input. However, the present disclosure is not limited to spoken and typed questions. The present disclosure is intended to cover other presently known and not yet discovered manners in which a natural language question can be input to the user device 110.

The user device 110 may send question data 115 (i.e., input data including or corresponding to the question) to the system component(s) 120 via the network(s) 199. In situations where the question is spoken by the user 105, the question data 115 may include the spoken question in the form of audio data. In situations where the question is typed via, for example, a graphical user interface (GUI) of the user device 110, the question data 115 may include the typed question in the form of text or tokenized data. One skilled in the art will appreciate that the question data 115 may take various forms depending on the manner in which the user 105 provides the question to the user device 110.

The system component(s) 120 includes a finetuned LLM 130 (e.g., a finetuned generative LLM) configured to perform open domain QA. The finetuned LLM 130 may be configured to receive a question in the form of text or tokenized data. If the question data 115 includes the question in a non-text or non-tokenized format, the system component(s) 120 may perform appropriate processing to convert the non-text or non-tokenized question data into a text or tokenized data that is processable by the finetuned LLM 130. Conversely, if the question data 115 includes the question in a text or tokenized format, the text or tokenized data, as received by the system component(s) 120, may be input to the finetuned LLM 130.

In situations where the question data 115 includes the question in the form of audio data, the audio data may be sent to an automatic speech recognition (ASR) component 150 of the system component(s) 120. The ASR component 150 may generate and output text or tokenized data corresponding to a transcript 125 of the spoken question. Generally, the ASR component 150 interprets the speech in the audio data based on a similarity between the audio data and pre-established language models. For example, the ASR component 150 may compare the audio data with models for sounds (e.g., acoustic units such as phonemes, senons, phones, etc.) and sequences of sounds to identify words that match the sequence of sounds of the speech represented in the audio data. Further details of processing performed by the ASR component 150 are described herein below with respect to FIG. 5.

The text or tokenized data, generated by the ASR component 150 and corresponding to a transcript 125 of the spoken question, may be input to a finetuned LLM 130. In situations where the question data 115 includes the question in the form of text or tokenized data (e.g., when the question is typed by the user 105), the text or tokenized data, as received by the system component(s) 120, may be input to the finetuned LLM 130.

The finetuned LLM 130 may process the question to generate answer data 135 including an answer to the question provided by the user 105. The answer data 135, as output by the finetuned LLM 130, may include the answer in the form of text or tokenized data. However, the present disclosure is not limited to any particular modality of presenting the answer to the user 105. For example, the answer may be provided as audio and/or displayed content (e.g., text and/or an image and/or a video). When the answer is to be output as audio, the text or tokenized output of the finetuned LLM 130 may undergo text-to-speech (TTS) processing, by the system component(s) 120 or the user device 110, to generate audio data including the answer in the form of synthesized speech. In some embodiments, the text or tokenized output of the finetuned LLM 130 may undergo natural language generation (NLG) processing to generate a natural language text or tokenized answer to the user's question, and the post-NLG text or tokenized answer may undergo the aforementioned TTS processing.

The user device 110 may output audio and/or display visual content corresponding to the answer. In some embodiments, a user device, different from the user device 110 but associated with the same user and/or group profile as discussed herein below with respect to FIG. 5, may be utilized to output a portion or all of the answer to the user 105.

An aspect of FIG. 1 relates to generation of the finetuned LLM 130. Such generation may involve receiving a pretrained LLM 140.

A LLM is an advanced artificial intelligence system designed to process, understand, and generate human-like text based on significant amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models.

The pretrained LLM 140 may be a generative LLM (i.e., a computer algorithm that processes natural language inputs and predicts the next word based on what the model has already seen).

The pretrained LLM 140 may be a transformer-based seq2seq model involving an encoder-decoder architecture. In an encoder-decoder architecture, the encoder may produce a representation of an input text using a bidirectional encoding, and the decoder may use that representation to perform some task. The pretrained LLM 140 may be a multilingual approximately 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the pretrained LLM 140 may be pre-trained for approximately 1 trillion tokens. Being trained on CLM tasks, the pretrained LLM 140 may be capable of in-context learning. An example of such a model is Alexa Teacher Model (TM).

In some embodiments, the pretrained LLM 140 may be a decoder-only architecture. The decoder-only architecture may use left-to-right (i.e., unidirectional) encoding of the input text. An example of such a LLM is the Generative Pre-trained Transformer 3 (GPT-3) and other versions of GPT. GPT-3 has a capacity of approximately 175 billion machine learning parameters.

Other examples of the pretrained LLM 140 include Big-Science Large Open-science Open-access Multilingual Language Model (BLOOM), Language Model for Dialogue Applications model (LaMDA), Bard, Large Language Model Meta AI (LLaMA), Titan Foundational Model, Bidirectional Auto-Regressive Transformers (BART), T5, etc.

The main goal of a text-generation model is to produce an output text sequence $y=[y_1, y_2, \ldots, y_T]$ based on a given input text sequence $x=[x_1, x_2, \ldots, x_S]$, where the lengths of the input and output sequences are denoted by S and T, respectively. With a generative LLM, the conditional probability of $P(y|x)$ for training the model can be computed. At test time, a decoding algorithm, such as Greedy or Beam Search, can be used to generate an output text with the highest likelihood. For QA, given a question q and a relevant content c (e.g., top answer candidates or context passages), previous works take (q, c) for as the source sequence to produce a response as the target sequence $a=f_\theta(q, c)$, where $f_\theta$ denotes the corresponding LLM with the parameters $\theta$. As a result, $f_\theta$ may merely learn to copy/synthesize information from c to produce a if c often contains necessary information for correctly answering the question q in training data. Relying solely on the retrieved content c, the model may fail to provide a correct answer for a given question if c is missing or contains irrelevant or noisy information. In other words, performance of these retrieval-based QA models are limited to an upper bound by a knowledge retriever. Previous works have combined data sources together to train an initial policy for reinforcement learning from human feedback; however, this strategy could lead to suboptimal performance for open domain QA due to the unbalanced distribution of different kinds of data.

Different from previous works that follow a single-step finetuning approach, the present disclosure provides for performing supervised finetuning in multiple steps, where a first training function 153 is used to generate an intermediary-tuned LLM 160, and a second training function 170 is used to generate the finetuned LLM 130 from the intermediary-tuned LLM 160. The first training function 153 may utilize pairs 155 of questions and context, whereas the second training function 170 may utilize only the questions 145. The first training function 153 may be represented as $a=f_\theta(q, c)$, where $f_\theta$ denotes the LLM with the parameters $\theta$, q denotes a question, and c denotes relevant context for the corresponding question. The second training function 170 may be represented as $a=f_\theta(q)$, where $f_\theta$ denotes the LLM with the parameters $\theta$, q denotes a question. The second training function 170 intentionally excludes the context c from the input to encourage the finetuned LLM 130 to extract its own parametric knowledge from the model parameters $\theta$, which may be pretrained on massive unlabeled text. Using the sequential finetuning method logy of the present disclosure, In this way, the finetuned LLM 130 is configured to not completely rely on retrieval results to generate answers for given questions. At test time, $a=f_\theta(q, c)$ may be used as input, where c is obtained by the herein-disclosed knowledge retriever, to make predictions. The retrieved content c can be considered as a source of external knowledge along with the pretrained knowledge contained in the model parameters $\theta$ to generate a final answer for the question.

Various QA datasets can be used in the finetuning process of the present disclosure. A QA dataset may include questions associated with context data usable to answer the corresponding question.

In some embodiments, Super Natural Instructions (SNI) can be used. SNI is a data collection proposed by Yizhong Wang et al., "SuperNaturalInstructions: Generalization via declarative instructions on 1600+ NLP tasks", in Proceedings of EMNLP, (2022), which is incorporated herein by referenced in its entirety. The corpus consists of 1,616 diverse NLP tasks and their expert-written instructions. In some embodiments of the present disclosure, only QA tasks, such as extractive QA with SQUAD and multiple choice QA with MCTest, may be used. For each task, anything but a question q, provided in the input, may be taken as context c. Particularly, the context c can be a passage, a fact, or a set of answer choices associated with the question. Using SNI, 180,000 examples can be obtained for finetuning the LLM of the present disclosure.

Anthropic can additionally or alternatively be used. Anthropic is introduced by Yuntao Bai et al., "Training a helpful and harmless assistant with reinforcement learning from human feedback", arXiv preprint arXiv: 2204.05862, (2022) (hereby incorporated by reference in its entirety), containing conversations between a human and a computer assistant. For each conversation, a human question and the previous question (if any) can be considered as the input sequence and the answer from the assistant as the output sequence. As questions in a conversation are usually related to each other, the previous question can be considered as a form of relevant context c for clarifying the current question q. Using Anthropic, 280,000 examples may be obtained for finetuning the LLM of the present disclosure.

One or more Answer Sentence Selection datasets, for example WikiQA (Yi Yang, et al., "Wikiqa: A challenge dataset for open-domain question answering", in Proceedings of EMNLP (2015) (hereby incorporated by reference in its entirety) and WDRASS (Zeyu Zhang et al., "Wdrass: A web-scale dataset for document retrieval and answer sentence selection", in Proceedings of the 31st ACM International Conference on Information & Knowledge Management, pp. 4707-4711 (2022) (hereby incorporated by reference in its entirety) may additionally or alternatively be used for finetuning the LLM of the present disclosure. WikiQA is a collection of questions and answer sentence candidates that have been manually annotated using Bing query logs on Wikipedia. WDRASS is a large-scale dataset of questions that are non-factoid in nature, such as questions that begin with "why" or "how". The dataset contains around 64,000 questions and over 800,000 labeled passages and sentences that have been extracted from a total of 30 million documents. Each question in such AS2 datasets is associated with a set of answer sentence candidates, in which some of the candidates are good answers (i.e., factually correct, natural, and direct) to the question. As a question can have multiple correct answer sentences, the longest answer sentence can be selected as the output sequence for the question. This results in a set of 105,000 examples for finetuning the LLM of the present disclosure.

The datasets where context is available for a question can be employed in the first step of the herein disclosed supervised finetuning process (i.e., can be incorporated into the pairs 155 of questions and context and processed using the first training function 153) while the others can be used for further training the LLM in the subsequent step (i.e., can be processed using the second training function 170). With a significant amount of various QA tasks, this training is expected to teach the finetuned LLM 130 to understand the nature of question answering and how to utilize its own pretrained knowledge (in case no context is provided) and relevant context to answer a given question. For convenience, $$f_\theta^{SFT}$$

be the finetuned LLM 130 obtained via the herein disclosed multi-step finetuning method.

While the foregoing description of FIG. 1 sets forth a multi-step training process for the finetuned LLM 130 in which the first step utilizes the pairs 155 of questions and context and the second step utilizes the questions 145 without the context, the present disclosure is not limited thereto. Embodiments of the present disclosure include the multi-step training process in which the first step utilizes the questions 145 without the context and the second step utilizes the pairs 155 of question and context. Moreover, the multi-step training process need not be limited to two steps. The multi-step training process of the present disclosure includes at least two steps that alternate training using pairs of questions and context and questions without the context.

While the foregoing description of FIG. 1 sets forth processing performed by the user device 110 and processing performed by the system component(s) 120, the present disclosure is not limited thereto. In some embodiments, the user device 110 may perform some or all of the processing (i.e., may implement some or all of the components) of the system component(s) 120 described with respect to FIG. 1.

Figure 2:
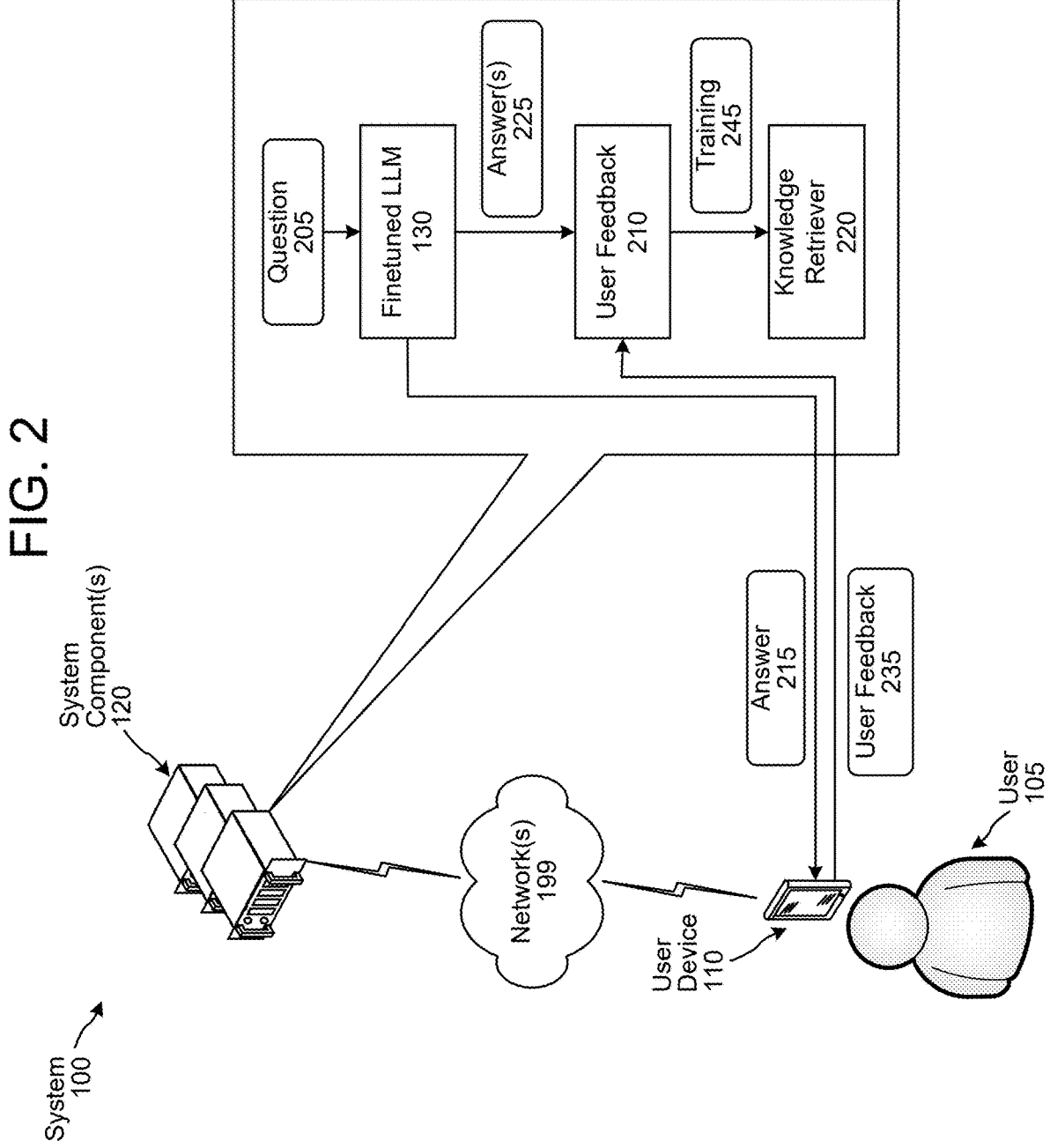
FIG. 2 is a conceptual diagram illustrating training of a knowledge retriever component, according to embodiments of the present disclosure.

After generating the finetuned LLM 130, a knowledge retriever component may be generated for identifying context for input to the finetuned LLM 130 at runtime. FIG. 2 is a conceptual diagram illustrating training of the knowledge retriever component.

Question data 205, including a question, is processed using the finetuned LLM 130 to generate an answer(s) data 225 including one or more answers to the question. Answer data 215, including an answer generated by the finetuned LLM 130 as a response to the question, may be sent to the user device 110 for output. In situations where the finetuned LLM 130 generates multiple answers, the answer data 215 may include one of the answers satisfying a condition (e.g., a top scoring answer of the answers as ranked by the finetuned LLM 130 or some other ranking component of the system 100). As described with FIG. 1, the user device 110 may present the answer in the answer data 215 as output audio (e.g., synthesized speech) and/or displayed content.

The user 105 may provide user feedback using the user device 110. The user feedback may indicate a correctness of the answer as to the question, a naturalness of the answer, and/or a directness of the answer. The user 105 may provide the user feedback in various ways, such as a spoken utterance, typed feedback, selection of a GUI element corresponding to a type of user feedback, etc.

The user device 110 may send user feedback data 235, indicating the user feedback, to a user feedback component 210 of the system component(s) 120. The user feedback component 210 may process the user feedback data 235 and the answer(s) data 225 to generate training data 245 used to generate the knowledge retriever component 220. In some instances, the training data 245 may include the question data 205, the answer(s) data 225, and an indication of the user feedback with respect to the output answer.

While the foregoing description of FIG. 2 sets forth processing performed by the user device 110 and processing performed by the system component(s) 120, the present disclosure is not limited thereto. In some embodiments, the user device 110 may perform some or all of the processing (i.e., may implement some or all of the components) of the system component(s) 120 described with respect to FIG. 2.

Figure 3:
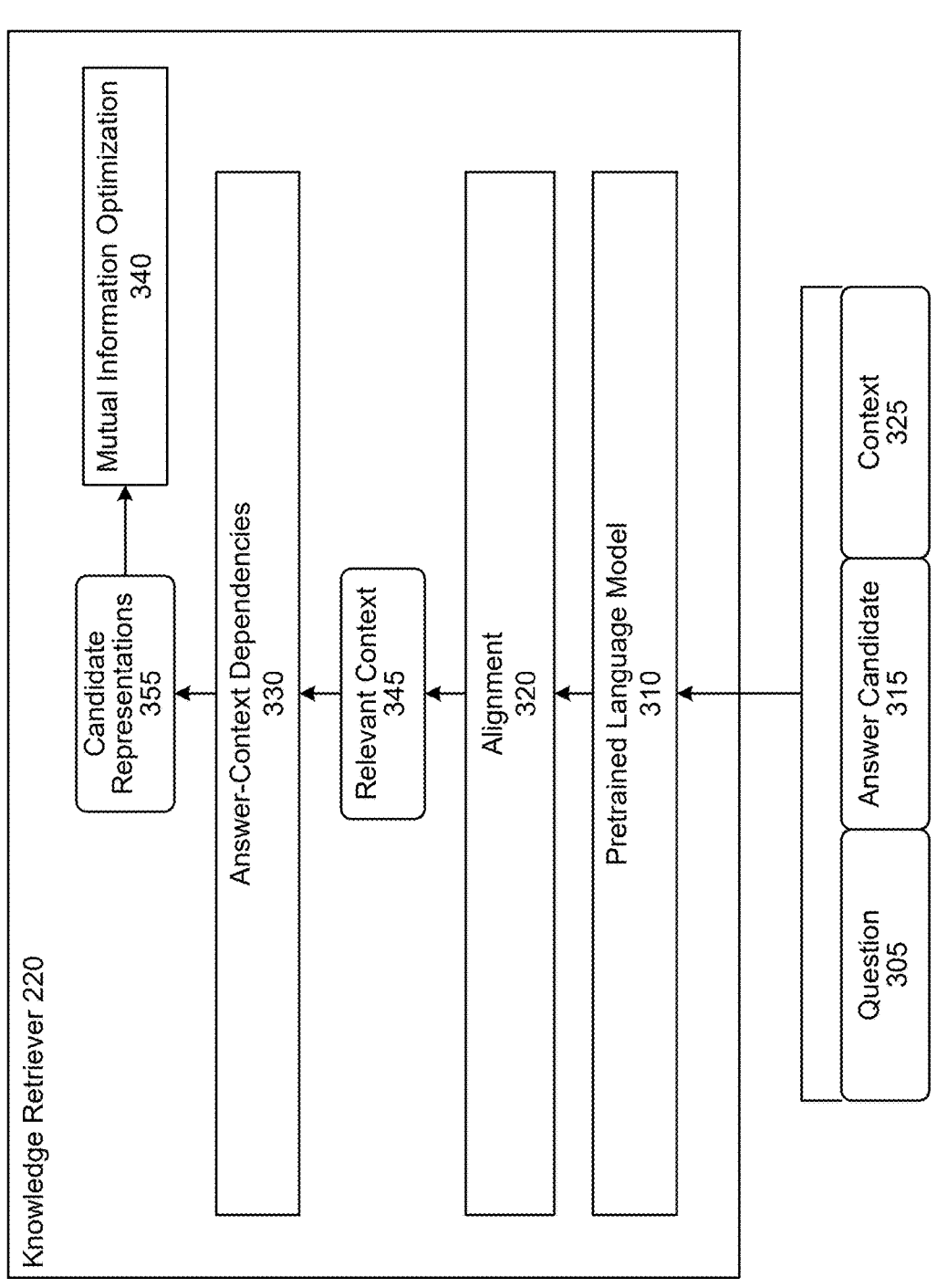
FIG. 3 is a conceptual diagram illustrating an example configuration of the knowledge retriever component, according to embodiments of the present disclosure.

FIG. 3 is a conceptual diagram illustrating an example configuration of the knowledge retriever component 220. The knowledge retriever component 220 may be implemented as an answer sentence selection model. Given a question q and a set of N answer sentence candidates (e.g., retrieved from the Internet) C={$c_1, c_2, \ldots, c_N$}, the task of AS2 seeks to find correct answers A ⊂ C via learning a reranking function r: Qx$\phi$(C)→$\phi$(C), where Q is the question set and $\phi$(C) is the set of all permutations of $\phi$(C), such that the correct answer sentences A are on top of the ranking produced by r. The reranker r may be a pointwise network m (q, $c_i$), for example TANDA (Siddhant Garg et al., "Tanda: Transfer and adapt pre-trained transformer models for answer sentence selection", Proceedings of AAAI, 34 (05), 7780-7788 (April 2020) (hereby incorporated by reference in its entirety)), which learns a correctness score $p_i \in (0,1)$ for each answer candidate $c_i$ for ranking. In some embodiments, contextual AS2 (Ivano Lauriola and Alessandro Moschitti, "Answer sentence selection using local and global context in transformer models", in Proceedings of ECIR, pp. 298-312 (2021) (hereby incorporated by reference in its entirety)) may be used, where additional context such as surrounding sentences is considered to better determine the correctness score for an answer candidate.

The knowledge retriever component 220 for contextual AS2 may have four main components: i) Encoding, ii) Question-Context Alignment with Optimal Transport (OT), iii) Answer-Context Dependencies, and iv) Mutual Information Optimization.

Given a question $$q = [w_1^q, w_2^q, \ldots, w_{T_q}^q]$$

$w_{T_q}^q$] with $T_q$ words and a set of N answer candidates C={$c_1$, $c_2, \ldots, c_N$} (e.g., retrieved by a search engine), where each candidate is a sentence $c_i$=

$$[w_1^c, w_2^c, \ldots, w_{T_c}^c]_{T_c}$$

words, and using Ivano Lauriola and Alessandro Moschitti, "Answer sentence selection using local and global context in transformer models", in Proceedings of ECIR, pp. 298-312 (2021), previous and next sentences $s_{prev}$, $s_{next}$ can be considered as additional context for each answer candidate c∈$C^1$. The input to the knowledge retriever component 220 may be formed by concatenating the question 305, the answer candidate 315, and context 325 including one or more sentences (e.g., the previous sentence and next sentence) to obtain a single input sequence: [q; C; $s_{prev}$; $s_{next}$]. The resulting sequence may be fed into a pre-trained language model 310 (e.g., ROBERTa, as provided in Yinhan Liu et al., "Roberta: A robustly optimized bert pretraining approach", arXiv preprint arXiv: 1907.11692 (2019) (hereby incorporated by reference in its entirety)) to obtain contextualized embeddings for the words.

$$[w_1^q, w_2^q, \ldots, w_{T_q}^q]$$

and $$[w_1^c, w_2^c, \ldots, w_{T_c}^c]$$

may be used to represents the sequences of word representations obtained from the last layer of the pre-trained language model 310 for the question q and the answer candidate c E C, respectively.

The following describes a method to find question-relevant context in the answer candidate and its context sentences by aligning the words between the question and the sentences. In some embodiments, the alignment component 320, of the knowledge retriever component 220, may apply Optimal Transport (as described in Gaspard Monge, "Memoire sur la theorie des deblais et des remblais', Mem. Math. Phys. Acad. Royale Sci., 666-704 (1781) and Marco Cuturi, "Sinkhorn distances: Lightspeed computation of optimal transport", Advances in neural information processing systems, 26 (2013) (hereby incorporated by reference in their entireties)) to solve the problem of the question-context alignment.

Optimal Transport is an established method to move probability from one distribution to another by finding an alignment between two point sets. In a discrete setting, two probability distributions $p_x$ and $p_y$ are given over two point sets $$X = \{x_i\}_{i=1}^n$$

and $$Y = \{y_j\}_{j=1}^m,$$

respectively ($\Sigma_i p_{x_i} = 1$ and $\Sigma_j p_{y_j} = 1$). A function D(x, y): X×Y→$\mathbb{R}^+$ is also provided to measure the distance between two points x and y. Optimal Transport aims to find a mapping that moves probability mass from the points $$\{x_i\}_{i=1}^n$$

to the points $$\{y_j\}_{j=1}^m$$

such that the total cost of transporting the probability mass between the two point sets is minimized. Formally, the goal of Optimal Transport is to find the transportation matrix $\pi_{xy} \in \mathbb{R}^{+^{n \times m}}$ that minimizes the following transportation cost:

$$d_{xy} = \sum_{\substack{1 \leq i \leq n \\ 1 \leq j \leq m}} D(x_i, y_j)\pi_{xy_{ij}}, \qquad \text{Equation 1}$$

such that $\pi_{xy} 1_m = p_x$ and $$\pi_{xy}^T 1_n = p_y.$$

The transportation matrix $\pi_{xy}$ represents the optimal alignment between the point sets X and Y, where the i-th row in the matrix provides the optimal alignment from a point $x_i \in X$ to each point $y_i \in Y$.

In the question-context alignment problem, the question q and a candidate/context sentence c may be considered as two point sets:

$$\{w_i^q\}_{i=1}^{T_q}$$

and $$\{w_i^c\}_{i=1}^{T_c},$$

respectively (each word is a point)[3]. To obtain the probability distributions for the sets, the frequencies of the words can be measured and a sum normalization performed. In particular, the probability distribution for the question may be computed as follows:

$$p_{w_i^q} = \frac{freq(w_i^q)}{\sum_{i'=1}^{T_q} freq(w_{i'}^q)}, \qquad \text{Equation 2}$$

where $$freq(w_i^q)$$

is the number of questions that the word $$w_i^q$$

appears in training data. The same process may be applied to the candidate/context sentence. The Laplace smoothing technique may be employed for the distributions to assign a non-zero probability to unseen words at test time.

Next, to estimate the distance between two words (points)

$$w_i^q$$

∈ q and $$w_j^c$$

∈c, their semantic divergence may be measured by computing the Euclidean distance of their contextualized representations obtained from the preliminary language model 310:

$$D\left(w_i^q, w_j^c\right) = \left\| w_i^q - w_j^c \right\|.$$

The optimal transportation matrix $\pi_{xy}$ (i.e., $\pi_{qc}$ for the question q and the sentence c) can then be solved efficiently using the Sinkhorn-Knopp algorithm as provided in Richard Sinkhorn and Paul Knopp, "Concerning nonnegative matrices and doubly stochastic matrices", Pacific Journal of Mathematics, 21 (2), 343-348 (1967) and Marco Cuturi, "Sinkhorn distances: Lightspeed computation of optimal transport", Advances in neural information processing systems, 26 (2013) (hereby incorporated by reference in their entireties). Finally, the alignment component 320 may obtain the relevant context 345 ($r_c$) for the sentence c as:

$$r_c = \bigcup_{i=1}^{T_q} \left\{ w_j^c \middle| j = \mathrm{argmax}_{1 \le j' \le T_c} \pi_{qc_{ij'}} \right\}.$$

In the end, the alignment component 320 may compute the representation for the sentence c as the average sum over the word representations for the relevant context:

$$r_c = \frac{1}{|r_c|} \sum_{j|w_j^c \in r_c} w_j^c. \qquad \text{Equation 3}$$

The relevant context 345 is expected that it could help remove noisy/irrelevant information from the sentence representation.

The knowledge retriever component 220 may also include an answer-context dependencies component 330 configured to perform the following processing. Letting [$r_1$, $r_2$, $r_3$] be the representations obtained from Equation 3 for the answer candidate $s_1 \equiv c$, the previous sentence $s_2 \equiv s_{prev}$, and the next sentence $s_3 \equiv s_{next}$, the answer-context dependencies component 330 can determine the dependencies among the sentences by considering each sentence as a node in a fully-connected graph G=(V, E), where V={$s_i$} (1≤i≤3) is the node set and E={($s_i$, $s_j$)} (1≤i, j≤3) is the edge set. The goal of the answer-context dependencies component 330 is to learn a weight $\alpha_{i,j} \in (0,1)$ for each edge ($s_i$, $s_j$) to represent the dependence of $s_i$ on $s_j$. To this end, the answer-context dependencies component 330 may employ their semantic representations $r_i$, $r_j$, and transportation costs to the question $d_{qs_i}$, $d_{qs_j}$ to measure the dependency weight $\alpha_{i,j}$ between the sentences $s_i$ and $s_j$. Particularly, the answer-context dependencies component 330 may first compute the score: $u_{ij} =$ FFN$_{DEP}$([$r_i \odot r_j$; $d_{qs_i}$; $d_{qs_j}$), where $\odot$ is the element-wise product, [;] represents the concatenation operation, and FFN$_{DEP}$ is a feed-forward network. Afterwards, the answer-context dependencies component 330 may obtain the weight $\alpha_{i,j}$ for the edge ($s_i$, $s_j$) via a softmax function:

$$\alpha_{i,j} = \frac{\exp(u_{ij})}{\sum_{j'=1}^{K} \exp(u_{ij'})}. \qquad \text{Equation 4}$$

The answer-context dependencies component 330 may then use the induced weights {$\alpha_{i,j}$} to enhance the representations for the sentences via L layers of a neural network (e.g., a Graph Convolutional Network), as described in Thomas N. Kipf and Max Welling, "Semi-supervised classification with graph convolutional networks", in Proceedings of ICLR (2017) (hereby incorporated by reference in its entirety):

$$h_i^l = ReLU\left( \sum_{j=1}^{K} \alpha_{i,j} W^l h_j^{l-1} + b^l \right), \qquad \text{Equation 5}$$

where $W^l$, $b^l$ are learnable weight matrix and bias for the layer/of the neural network (e.g., Graph Convolutional Network) (1≤l≤L), and $$h_i^0 \equiv r_i$$

is the input representation for the sentence $s_i$. The output vectors $$h_i^L \equiv h_i$$

at the last layer of the neural network (e.g., Graph Convolutional Network) serve as the final representations for the sentences $s_i$. The weights $\alpha_{i,j}$ enable each sentence to decide the amount of information it receives from the other sentences to improve its representation (e.g., for AS2). The answer-context dependencies component 330 may send the representation $h_1$ for the answer candidate $s_1 = c$ to a feed-forward network with a sigmoid output function to estimate the correctness score $p_c \in (0,1)$ for the answer candidate c:

$$p_c = \text{FFN}_{AS2}(h_1). \qquad \text{Equation 6}$$

For training the answer-context dependencies component 330, we minimize the binary cross-entropy loss $L_{AS2}$ may be minimized with the correctness scores $p_c$.

The answer-context dependencies component 330 may output candidate representations 355 at inference.

In some embodiments, the knowledge retriever component 220 may include a mutual information optimization component 340 configured to perform mutual information optimization utilizing the candidate representations 355. In information theory, mutual information is defined as the Kullback-Leibler divergence between the joint distribution and the product of the marginal distributions of two random variables (see C. E. Shannon, "A mathematical theory of communication", The Bell System Technical Journal (1948) (hereby incorporated by reference in its entirety)). As a result, two random variables would be more dependent if their mutual information value is large. In the context of the present disclosure, context sentences can either be correct or incorrect answers for the question. Thus, answer sentence pairs can be expected to share more semantic information and (answer, non-answer) sentence pairs to share less semantic information relevant to the question. This can be done by considering sentence representation vectors $h_i$ as random variables and maximizing/minimizing the mutual information between the variables, respectively. However, the sentence vectors $h_i$ may be very high dimensional variables, making the exact calculation of the mutual information between the vectors impossibly expensive. To over-come this, we followed the mutual information neural estimation (MINE) method (see Mohamed Ishmael Belghazi et al., "Mutual information neural estimation", pp. 531-540. PMLR (2018) and Devon Hjelm et al., "Learning deep representations by mutual information estimation and maximization", in ICLR (2019) (hereby incorporated by reference in their entireties)) may be followed to estimate and optimize the lower bound of the mutual information between the variables via the binary cross entropy of a variable discriminator U, which may be a feed-forward network with a sigmoid output function:

$$L_{MI} = -\Sigma_{(i,j) \in I_+} \log(U[h_i; h_j]) - \Sigma_{(i',j') \in I_-} \log(1 - U[h_i; h_j]), \quad \text{Equation 7}$$

where $I_+ = \{(i, j) | s_i, s_j) \in A\}$ $(1 \leq i, j \leq 3)$ is the index set for answer sentence pairs, and $I_- = \{(i', j') | s_{i'} \in A, s_{j'} \notin A\}$ $(1 \leq i', j' \leq 3)$ is the index set for (answer, non-answer) sentence pairs among the three sentences.

All the components of the knowledge retriever component 220 may be jointly trained via minimizing the following loss function:

$$L = L_{AS2} + \gamma L_{MI}, \quad \text{Equation 8}$$

where γ is a hyper-parameter to balance the contributions of each component to the training of the model. Following Siddhant Garg et al., "Tanda: Transfer and adapt pre-trained transformer models for answer sentence selection", Proceedings of AAAI, 34 (05), 7780-7788 (April 2020) and Ivano Lauriola and Alessandro Moschitti, "Answer sentence selection using local and global context in transformer models", in Proceedings of ECIR, pp. 298-312 (2021) (hereby incorporated by reference in their entireties), all answer candidates for each question may be considered for training and inference.

Figure 4:
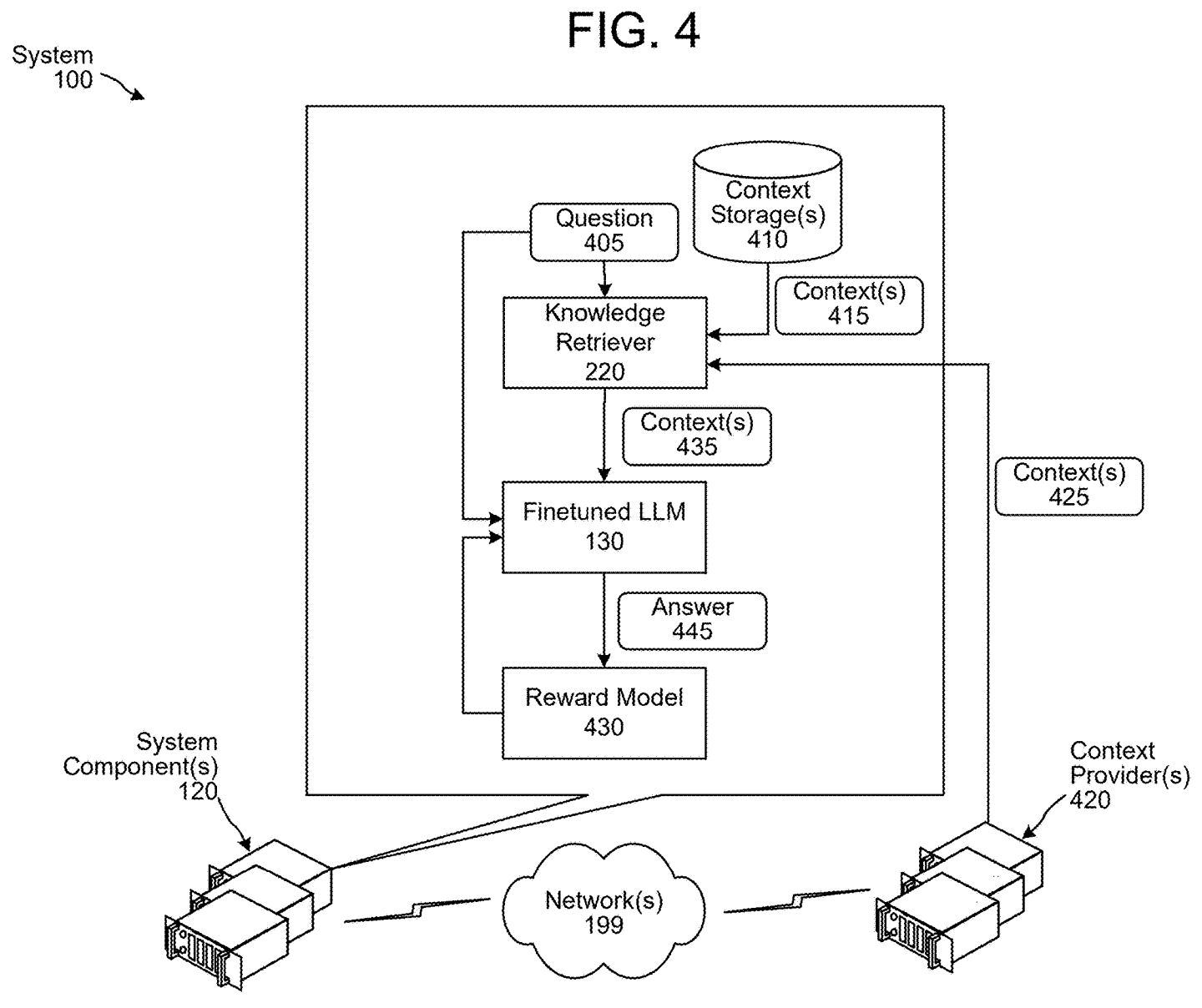

Referring to FIG. 4, optional optimization of the finetuned LLM using proximal policy optimization is described. When question data 405 is input to the knowledge retriever component 220, the knowledge retriever component 220 may process, as described herein above with respect to FIG. 3, to obtain relevant context(s) data 415 from one or more context storages 410 of the system component(s) 120 and/or relevant context(s) data 425 from one or more context providers 420 via the network(s) 199. For example, knowledge retriever component 220 may obtain the context(s) data 425 from the one or more context providers 420 using an unstructured web search. In other words, the one or more context providers 420 may be one or more webpages accessed via the Internet.

The one or more context storages 410 may store various context data in the form of one or more tables, one or more knowledge graphs, and/or one or more other data structures. The one or more context storages 410 may store various types of context information that is usable in answering open domain questions. The one or more context storages 410 may include a collection of tuples or otherwise semantically (or otherwise) encoded data that can be queried to obtain the context(s) data 415. One example of such a context storage is Amazon's EVI knowledge base.

The knowledge retriever component 220 outputs context(s) data 435 including one or more instances of contextual information the knowledge retriever 220 determined to be relevant to answering the question in the question data 405. The context(s) data 435 and the question data 405 are thereafter input to the finetuned LLM 130, which processes the input data to determine answer data 445 including one or more answers to the question. The answer data 445 is input to a reward model 430.

The reward model 430 may employ reinforcement learning as described in Daniel M Ziegler et al., "Finetuning language models from human preferences", arXiv preprint arXiv: 1909.08593 (2019); Nisan Stiennon et al., "Learning to summarize with human feedback", Advances in Neural Information Processing Systems, 33, 3008-3021 (2020); Long Ouyang et al., "Training language models to follow instructions with human feedback", Advances in Neural Information Processing Systems, 35, 27730-27744 (2022); and Yuntao Bai et al., "Training a helpful and harmless assistant with reinforcement learning from human feedback", arXiv preprint arXiv: 2204.05862 (2022) (hereby incorporated by reference in their entireties). The reward model 430 may use the AS2 reward r (q, a) as an approximation to human judgement for an entire model response. The finetuned LLM 130 may be optimized against the reward model 430. We optimize by employing a proximal policy optimization algorithm, such as that described in John Schulman et al., "Proximal policy optimization algorithms", arXiv preprint arXiv: 1707.06347 (2017) (hereby incorporated by reference in its entirety). In the proximal policy optimization algorithm, each time step may represent a subword token. The policy may begin with the $$f_\theta^{SFT}$$

finetuned LLM 130. The reward model 430 may also include a term that penalizes the knowledge retriever component divergence between the learned RL policy $$f_\phi^{RL}$$

and the original supervised model $$f_\theta^{SFT}.$$

In particular, the reward model 430 can be written as:

$$R(q, a) = r(q, a) - \beta \log[f_\phi^{RL}(q, c)/f_\theta^{SFT}(q, c)], \quad \text{Equation 9}$$

where q represents a question, c is the top K facts retrieved from the one or more context storages 410 and/or the one or more context providers 420 by the knowledge retriever component 220, a is the output of the finetuned LLM 130, and β is a trade-off hyper-parameter. In Equation 9, the added Kullback-Leibler term fulfills dual objectives. First, it functions as an entropy bonus, motivating the policy $$f_\phi^{RL}$$

to explore and stopping it from converging on a single mode. Second, it guarantees that the policy avoids producing outputs that significantly deviate from those produced by the original supervised model $$f_\theta^{SFT}.$$

For the proximal policy optimization value function, another (e.g., generative) LLM can be employed, initialized with the finetuned LLM 130

$$f_\theta^{SFT},$$

and put on top a randomly initialized value head that will be learned during the training.

While the foregoing description of FIG. 4 sets forth processing performed by the system component(s) 120, the present disclosure is not limited thereto. In some embodiments, the user device 110 may perform some or all of the processing (i.e., may implement some or all of the components) of the system component(s) 120 described with respect to FIG. 4.

Figure 5:
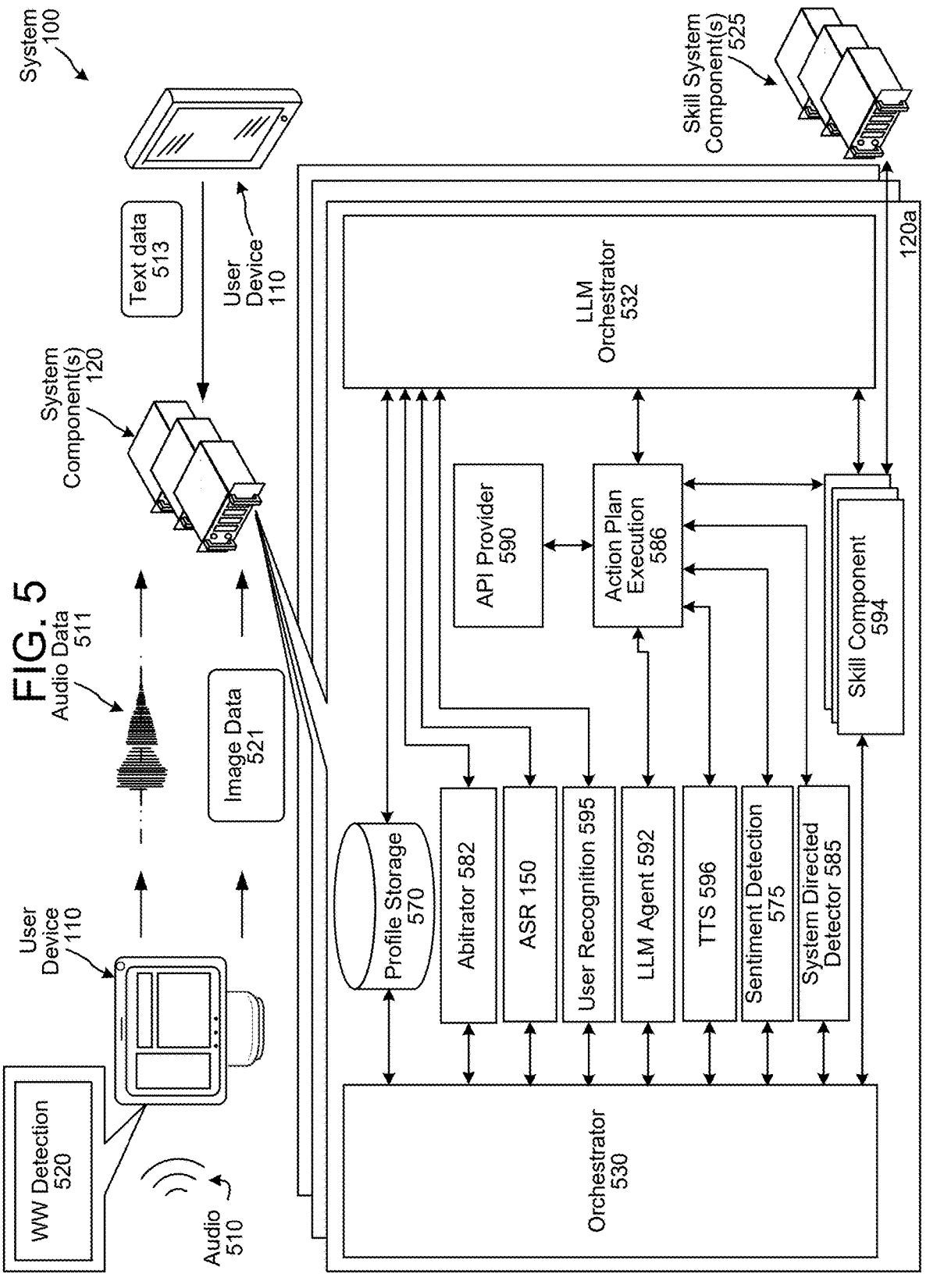
FIG. 5 is a conceptual diagram of components of a system, according to embodiments of the present disclosure.

The system 100 may operate using various components as described in FIG. 5. The various components may be located on same or different physical devices. Communication between various components may occur directly or across a network(s) 199. The user device 110 may include audio capture component(s), such as a microphone or array of microphones of a user device 110, captures audio 510 and creates corresponding audio data. Once speech is detected in audio data representing the audio 510, the user device 110 may determine if the speech is directed at the user device 110/system component(s). In at least some embodiments, such determination may be made using a wakeword detection component 520. The wakeword detection component 520 may be configured to detect various wakewords. In at least some examples, each wakeword may correspond to a name of a different digital assistant. An example wakeword/ digital assistant name is "Alexa." In another example, input to the system may be in form of text data 513, for example as a result of a user typing an input into a user interface of user device 110. Other input forms may include indication that the user has pressed a physical or virtual button on user device 110, the user has made a gesture, etc. The user device 110 may also capture images using camera(s) 818 of the user device 110 and may send image data 521 representing those image(s) to the system component(s). The image data 521 may include raw image data or image data processed by the user device 110 before sending to the system component(s). The image data 521 may be used in various manners by different components of the system to perform operations such as determining whether a user is directing an utterance to the system, interpreting a user command, responding to a user command, etc.

The wakeword detection component 520 of the user device 110 may process the audio data, representing the audio 510, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 510, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 520 and/or input is detected by an input detector, the user device 110 may "wake" and begin transmitting audio data 511, representing the audio 510, to the system component(s) 120. The audio data 511 may include data corresponding to the wakeword; in other embodiments, the portion of the audio corresponding to the wakeword is removed by the user device 110 prior to sending the audio data 511 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 520 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 594 of one or more system component(s) 120.

The user device 110 may also include a system directed input detector 685. (The system component(s) may also include a system directed input detector 585 which may operate in a manner similar to system directed input detector 685.) The system directed input detector 685 may be configured to determine whether an input to the system (for example speech, a gesture, etc.) is directed to the system or not directed to the system (for example directed to another user, etc.). The system directed input detector 685 may work in conjunction with the wakeword detection component 520. If the system directed input detector 685 determines an input is directed to the system, the user device 110 may "wake" and begin sending captured data for further processing. If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 685 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 685 is determining whether an input is potentially device directed. For example, the system may output an orange indicator while considering an input, and may output a green indicator if a system directed input is detected. Other such configurations are possible.

Upon receipt by the system component(s) 120, the audio data 511 may be sent to an orchestrator component 530 and/or the LLM orchestrator component 532. The orchestrator component 530 may include memory and logic that enables the orchestrator component 530 to transmit various pieces and forms of data to various components of the system, as well as perform other operations as described herein. In some embodiments, the orchestrator component 530 may optionally be included in the system component(s) 120. In embodiments where the orchestrator component 530 is not included in the system component(s) 120, the audio data 511 may be sent directly to the LLM orchestrator component 532. Further, in such embodiments, each of the components of the system component(s) 120 may be configured to interact with the LLM orchestrator component 532, the action plan execution component 586, and/or the API provider component 590.

In some embodiments, the system component(s) 120 may include an arbitrator component 582, which may be configured to determine whether the orchestrator component 530 and/or the LLM orchestrator component 532 are to process with respect to the audio data 511. In some embodiments, the arbitrator component 582 may determine the orchestrator component 530 and/or the LLM orchestrator component 532 are to process with respect to the audio data 511 based on metadata associated with the audio data 511. For example, the arbitrator component 582 may be a classifier configured to process a natural language representation of the audio data 511 (e.g., output by the ASR component 150) and classify the corresponding user input as requiring the processing of the orchestrator component 530 and/or the LLM orchestrator component 532. For further example, the arbitrator component 582 may determine whether the device from which the audio data 511 is received is associated with an indicator representing the audio data 511 is to be processed by the orchestrator component 530 and/or the LLM orchestrator component 532. As an even further example, the arbitrator component 582 may determine whether the user (e.g., determined using data output from the user recognition component 595) from which the audio data 511 is received is associated with a user profile including an indicator representing the audio data 511 is to be processed by the orchestrator component 530 and/or the LLM orchestrator component 532. As another example, the arbitrator component 582 may determine whether the audio data 511 (or the output of the ASR component 150) corresponds to a request representing that the audio data 511 is to be processed by the orchestrator component 530 and/or the LLM orchestrator component 532 (e.g., a request including "let's chat" may represent that the audio data 511 is to be processed by the LLM orchestrator component 532). In some embodiments, if the arbitrator component 582 is unsure (e.g., a confidence score corresponding to whether the orchestrator component 530 and/or the LLM orchestrator component 532 is to process is below a threshold), then the arbitrator component 582 may send the audio data 511 to both of the orchestrator component 530 and the LLM orchestrator component 532. In such embodiments, the orchestrator component 530 and/or the LLM orchestrator component 532 may include further logic for determining further confidence scores during processing representing whether the orchestrator component 530 and/or the LLM orchestrator component 532 should continue processing.

The arbitrator component 582 may send the audio data 511 to an ASR component 150. In some embodiments, the component selected to process the audio data 511 (e.g., the orchestrator component 530 and/or the LLM orchestrator component 532) may send the audio data 511 to the ASR component 150. The ASR component 150 may transcribe the audio data 511 into text data. The text data output by the ASR component 150 represents one or more than one (e.g., in the form of an N-best list) ASR hypotheses representing speech represented in the audio data 511. The ASR component 150 interprets the speech in the audio data 511 based on a similarity between the audio data 511 and pre-established language models. For example, the ASR component 150 may compare the audio data 511 with models for sounds (e.g., acoustic units such as phonemes, senons, phones, etc.) and sequences of sounds to identify words that match the sequence of sounds of the speech represented in the audio data 511. The ASR component 150 sends the text data generated thereby to the arbitrator component 582, the orchestrator component 530, and/or the LLM orchestrator component 532. In instances where the text data is sent to the arbitrator component 582, the arbitrator component 582 may send the text data to the component selected to process the audio data 511 (e.g., the orchestrator component 530 and/or the LLM orchestrator component 532). The text data sent from the ASR component 150 to the arbitrator component 582, the orchestrator component 530, and/or the LLM orchestrator component 532 may include a single top-scoring ASR hypothesis or may include an N-best list including multiple top-scoring ASR hypotheses. An N-best list may additionally include a respective score associated with each ASR hypothesis represented therein.

A skill system component(s) 525 may communicate with a skill component(s) 594 within the system component(s) 120 directly with the orchestrator component 530 and/or the action plan execution component 586, or with other components. A skill system component(s) 525 may be configured to perform one or more actions. An ability to perform such action(s) may sometimes be referred to as a "skill." That is, a skill may enable a skill system component(s) 525 to execute specific functionality in order to provide data or perform some other action requested by a user. For example, a weather service skill may enable a skill system component(s) 525 to provide weather information to the system component(s) 120, a car service skill may enable a skill system component(s) 525 to book a trip with respect to a taxi or ride sharing service, an order pizza skill may enable a skill system component(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 594 dedicated to interacting with the skill system component(s) 525. Unless expressly stated otherwise, reference to a skill, skill device, or skill component may include a skill component 594 operated by the system component(s) 120 and/or skill operated by the skill system component(s) 525. Moreover, the functionality described herein as a skill or skill may be referred to using many different terms, such as an action, bot, app, or the like. The skill component 594 and or skill system component(s) 525 may return output data to the orchestrator component 530.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 596. The TTS component 596 may generate audio data (e.g., synthesized speech) from text data using one or more different methods. Text data input to the TTS component 596 may come from a skill component 594, the orchestrator component 530, or another component of the system. In one method of synthesis called unit selection, the TTS component 596 matches text data against a database of recorded speech. The TTS component 596 selects matching units of recorded speech and concatenates the units together to form audio data. In another method of synthesis called parametric synthesis, the TTS component 596 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 511 representing the commands to the system component(s) 120 for processing, after which the system component(s) 120 may return output data that can cause the user device 110 to engage its camera.

The system component(s) 120 may include a user recognition component 595 that recognizes one or more users using a variety of data. However, the disclosure is not limited thereto, and the user device 110 may include a user recognition component 695 instead of and/or in addition to user recognition component 595 of the system component(s) 120 without departing from the disclosure. User recognition component 695 operates similarly to user recognition component 595.

The user recognition component 595 may take as input the audio data 511 and/or text data output by the ASR component 150. The user recognition component 595 may perform user recognition by comparing audio characteristics in the audio data 511 to stored audio characteristics of users. The user recognition component 595 may also perform user recognition by comparing biometric data (e.g., fingerprint data, iris data, etc.), received by the system in correlation with the present user input, to stored biometric data of users assuming user permission and previous authorization. The user recognition component 595 may further perform user recognition by comparing image data (e.g., including a representation of at least a feature of a user), received by the system in correlation with the present user input, with stored image data including representations of features of different users. The user recognition component 595 may perform additional user recognition processes, including those known in the art.

The user recognition component 595 determines scores indicating whether user input originated from a particular user. For example, a first score may indicate a likelihood that the user input originated from a first user, a second score may indicate a likelihood that the user input originated from a second user, etc. The user recognition component 595 also determines an overall confidence regarding the accuracy of user recognition operations.

Output of the user recognition component 595 may include a single user identifier corresponding to the most likely user that originated the user input. Alternatively, output of the user recognition component 595 may include an N-best list of user identifiers with respective scores indicating likelihoods of respective users originating the user input. The output of the user recognition component 595 may be used to inform processing of the arbitrator component 582, the orchestrator component 530, and/or the LLM orchestrator component 532 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 575 that may be configured to detect a sentiment of a user from audio data representing speech/utterances from the user, image data representing an image of the user, and/or the like. The sentiment detection component 575 may be included in system component(s) 120, as illustrated in FIG. 5, although the disclosure is not limited thereto and the sentiment detection component 575 may be included in other components without departing from the disclosure. For example the sentiment detection component 675 may be included in the user device 110, as a separate component, etc. Sentiment detection component 675 may operate similarly to sentiment detection component 575. The system component(s) may use the sentiment detection component 575 to, for example, customize a response for a user based on an indication that the user is happy or frustrated.

Figure 6:
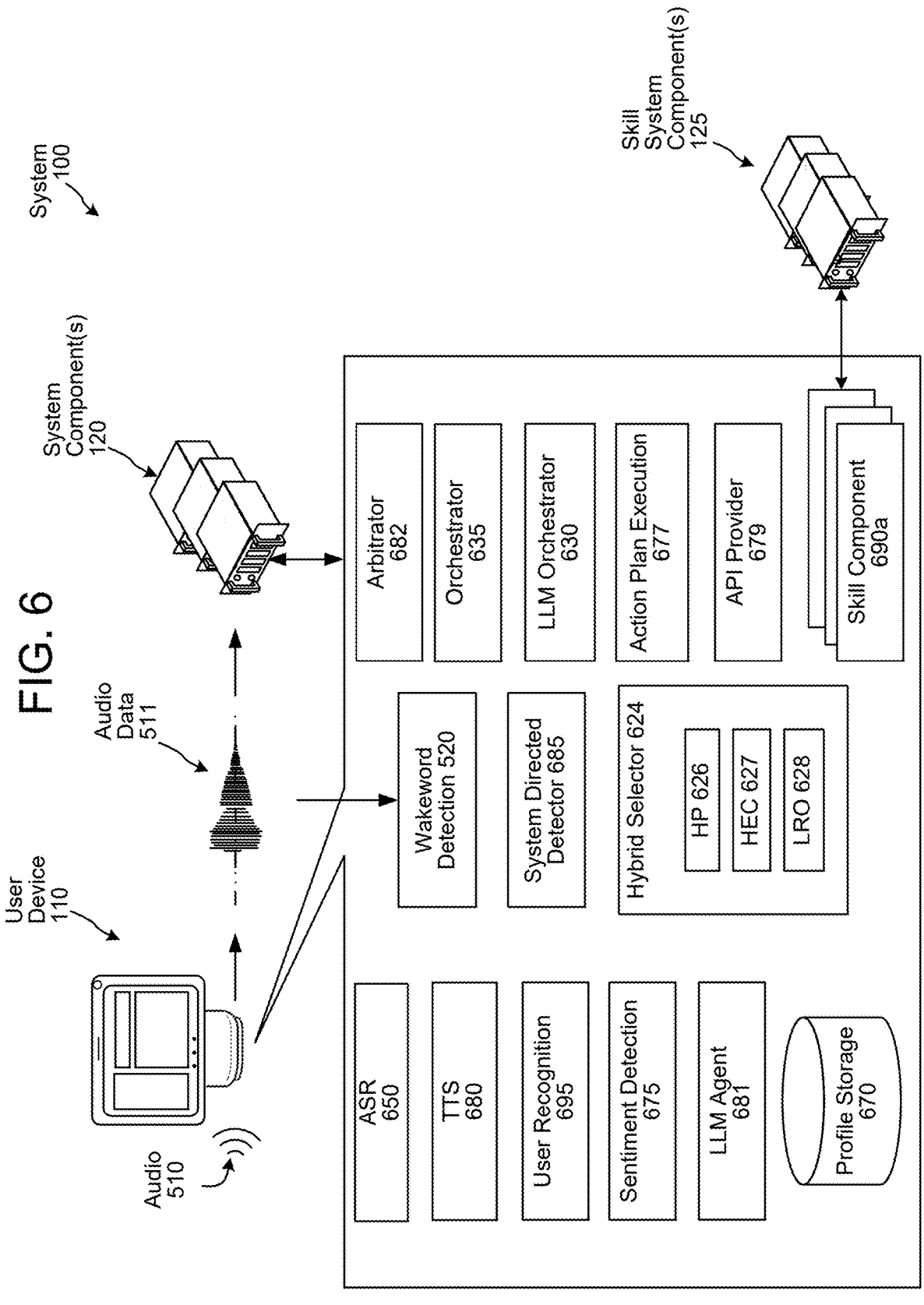
FIG. 6 is a conceptual diagram illustrating components that may be included in a user device, according to embodiments of the present disclosure.

Although the components of FIG. 5 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 6 illustrates such a configured user device 110.

In at least some embodiments, the system component(s) may receive the audio data 511 from the user device 110, to recognize speech corresponding to a spoken input in the received audio data 511, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component 680) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 5, the user device 110 may include a wakeword detection component 520 configured to compare the audio data 511 to stored models used to detect a wakeword (e.g., "Alexa") that indicates to the user device 110 that the audio data 511 is to be processed by the user device 110 (e.g., by the orchestrator component 635 and/or the LLM orchestrator 630, which are configured similar to the orchestrator component 530 and the LLM orchestrator component 532, respectively). In at least some embodiments, a hybrid selector 624, of the user device 110, may send the audio data 511 to the wakeword detection component 520. If the wakeword detection component 520 detects a wakeword in the audio data 511, the wakeword detection component 520 may send an indication of such detection to the hybrid selector 624. In response to receiving the indication, the hybrid selector 624 may send the audio data 511 to the system component(s) and/or the ASR component 650. The wakeword detection component 520 may also send an indication, to the hybrid selector 624, representing a wakeword was not detected. In response to receiving such an indication, the hybrid selector 624 may refrain from sending the audio data 511 to the system component(s), and may prevent the ASR component 650 from further processing the audio data 511. In this situation, the audio data 511 can be discarded.

The user device 110 may conduct its own speech processing using on-device language processing components, such as an ASR component 650, similar to the manner discussed herein with respect to the ASR component 150 of the system component(s). The ASR component 650 may operate similarly to ASR component 150. The user device 110 may also internally include, or otherwise have access to, other components such as one or more skill components 690 capable of executing commands based on the output of the orchestrator component 635, the LLM orchestrator 630, or other results determined by the user device 110/system component(s) (which may operate similarly to skill components 594), an arbitrator component 682 (configured to process in a similar manner to that discussed herein above with respect to the arbitrator component 582), an action plan execution component 677 (configured to process in a similar manner to that discussed herein with respect to the action plan execution component 586), an API provider component 679 (configured to process in a similar manner to that discussed herein with respect to the API provider component 590), and LLM agent component 681 (configured to process in a similar manner to that discussed herein with respect to the LLM agent component 592), a user recognition component 695 (configured to process in a similar manner to that discussed herein with respect to the user recognition component 595 of the system component(s)), profile storage 670 (configured to store similar profile data to that discussed herein with respect to the profile storage 570 of the system component(s)), or other components. In at least some embodiments, the profile storage 670 may only store profile data for a user or group of users specifically associated with the user device 110. Similar to as described above with respect to skill component 594, a skill component 690 may communicate with a skill system component(s) 525. The user device 110 may also have its own TTS component 680, which may operate similarly to TTS component 596.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector 624, of the user device 110, may include a hybrid proxy (HP) 626 configured to proxy traffic to/from the system component(s). For example, the HP 626 may be configured to send messages to/from a hybrid execution controller (HEC) 627 of the hybrid selector 624. For example, command/directive data received from the system component(s) can be sent to the HEC 627 using the HP 626. The HP 626 may also be configured to allow the audio data 511 to pass to the system component(s) while also receiving (e.g., intercepting) this audio data 511 and sending the audio data 511 to the HEC 627.

In at least some embodiments, the hybrid selector 624 may further include a local request orchestrator (LRO) 628 configured to notify the ASR component 650 about the availability of new audio data 511 that represents user speech, and to otherwise initiate the operations of local language processing when new audio data 511 becomes available. In general, the hybrid selector 624 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 511 is received, the HP 626 may allow the audio data 511 to pass through to the system component(s) and the HP 626 may also input the audio data 511 to the on-device ASR component 650 by routing the audio data 511 through the HEC 627 of the hybrid selector 624, whereby the LRO 628 notifies the ASR component 650 of the audio data 511. At this point, the hybrid selector 624 may wait for response data from either or both of the system component(s) or the local language processing components. However, the disclosure is not limited thereto, and in some examples the hybrid selector 624 may send the audio data 511 only to the local ASR component 650 without departing from the disclosure. For example, the user device 110 may process the audio data 511 locally without sending the audio data 511 to the system component(s).

The local ASR component 650 is configured to receive the audio data 511 from the hybrid selector 624, and to recognize speech in the audio data 511. The user device 110 and/or the system component(s) may associate a unique identifier with each natural language user input. The user device 110 may include the unique identifier when sending the audio data 511 to the system component(s), and the response data from the system component(s) may include the unique identifier to identify which natural language user input the response data corresponds.

In at least some embodiments, the user device 110 may include, or be configured to use, one or more skill components 690 that may work similarly to the skill component(s) 594 implemented by the system component(s). The skill component(s) 690 may correspond to one or more domains that are used in order to determine how to act on a spoken input in a particular way, such as by outputting a directive that corresponds to the determined intent, and which can be processed to implement the desired operation. The skill component(s) 690 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 525. For example, a skill system component(s) 525 may be located in a remote environment (e.g., separate location) such that the user device 110 may only communicate with the skill system component(s) 525 via the network(s) 199. However, the disclosure is not limited thereto. For example, in at least some embodiments, a skill system component(s) 525 may be configured in a local environment (e.g., home server and/or the like) such that the user device 110 may communicate with the skill system component(s) 525 via a private network, such as a local area network (LAN).

As used herein, a "skill" may refer to a skill component 690, a skill system component(s) 525, or a combination of a skill component 690 and a corresponding skill system component(s) 525.

Similar to the manner discussed with regard to FIG. 5, the local user device 110 may be configured to recognize multiple different wakewords and/or perform different categories of tasks depending on the wakeword. Such different wakewords may invoke different processing components of local user device 110 (not illustrated in FIG. 6). For example, detection of the wakeword "Alexa" by the wakeword detection component 520 may result in sending audio data to certain skill components 690 for processing while detection of the wakeword "Computer" by the wakeword detector may result in sending audio data different skill components 690 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 7 is a block diagram conceptually illustrating a user device 110 that may be used with the system. FIG. 8 is a block diagram conceptually illustrating example components of a remote device, such as the natural language command processing system component(s) 120, which may assist with ASR processing, NLU processing, etc., and a skill system component(s) 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user devices in a home/office. One benefit to the system component(s) 120 being in a user's home/business is that data used to process a command/return a response may be kept within the user's home, thus reducing potential privacy concerns.

Multiple systems (120/525) may be included in the system 100 of the present disclosure, such as a system component(s) 120 for performing ASR processing, a system component(s) 120 for performing NLU processing, one or more skill system components 525, etc. In operation, each of these systems may include computer-readable and computer-executable instructions that reside on the respective device (120/525), as will be discussed further below.

Each of these devices (110/120/525) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/525) may also include a data storage component (708/808) for storing data and controller/processor-executable instructions. Each data storage component (708/808) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (702/802).

Computer instructions for operating each device (110/120/525) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/525) includes input/output device interfaces (702/802). A variety of components may be connected through the input/output device interfaces (702/802), as will be discussed further below. Additionally, each device (110/120/525) may include an address/data bus (724/824) for conveying data among components of the respective device. Each component within a device (110/120/525) may also be directly connected to other components in addition to (or instead of) being connected to other components across the bus (724/824).

Referring to FIG. 7, the user device 110 may include input/output device interfaces 702 that connect to a variety of components such as an audio output component such as a speaker 712, a wired headset or a wireless headset (not illustrated), or other component capable of outputting audio. The user device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 716 for displaying content. The user device 110 may further include a camera 718.

Via antenna(s) 722, the input/output device interfaces 702 may connect to the network(s) 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the user device 110, the natural language command processing system component(s) 120, or a skill system component(s) 525 may include their own dedicated processors, memory, and/or storage. Alternatively, one or more of the components of the user device 110, the natural language command processing system component(s) 120, or a skill system component(s) 525 may utilize the I/O interfaces (702/802), processor(s) (704/804), memory (706/806), and/or storage (708/808) of the user device 110, natural language command processing system component(s) 120, or the skill system component(s) 525, respectively.

Thus, the ASR component 150 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and a skill system component(s) 525, as described herein, are illustrative, and may be located as a stand-alone device or may be included, in whole or in part, as a component of a larger device or system. As can be appreciated, a number of components may exist either on a system component(s) 120 and/or on device 110. Unless expressly noted otherwise, the system version of such components may operate similarly to the device version of such components and thus the description of one version (e.g., the system version or the local version) applies to the description of the other version (e.g., the local version or system version) and vice-versa.

Figure 9:
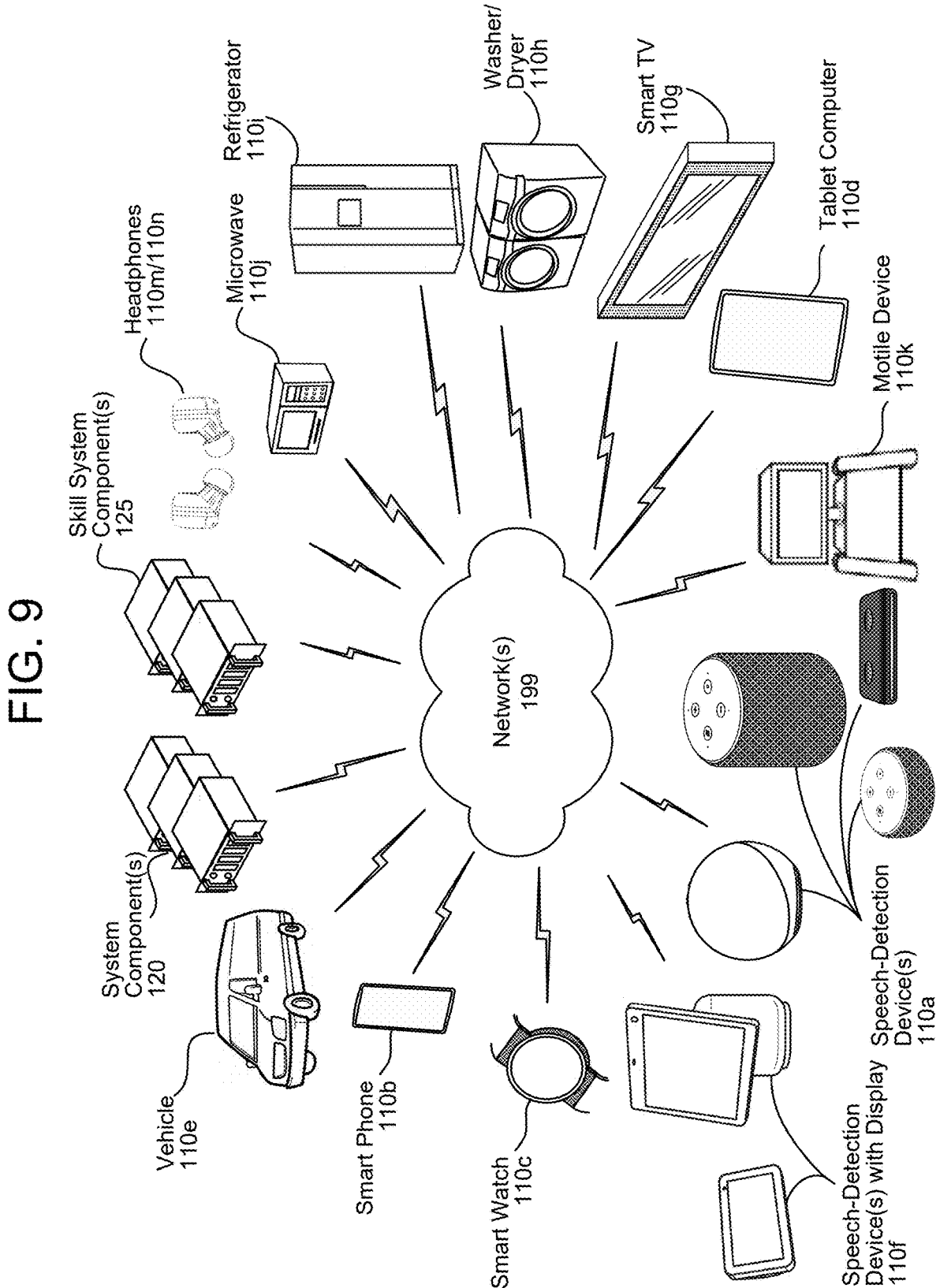
FIG. 9 illustrates an example of a computer network, according to embodiments of the present disclosure.

As illustrated in FIG. 9, multiple devices (110a-110n, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 560, etc. of the natural language command processing system component(s) 120.

EXAMPLES

Example 1. Benchmarking Knowledge Retriever Via Answer Sentence Selection

Model performance was measured using the following standard metrics: Precision-at-1 (P@1), Mean Average Precision (MAP), and Mean Reciprocal Rank (MRR) scores, on the entire set of answer candidate sentences for each question.

The evaluation scheme studied for answer sentence selection tasks was employed (see Siddhant Garg et al., "Tanda: Transfer and adapt pre-trained transformer models for answer sentence selection", Proceedings of AAAI, 34 (05), 7780-7788 (April 2020); Ivano Lauriola and Alessandro Moschitti, "Answer sentence selection using local and global context in transformer models", in Proceedings of ECIR, pp. 298-312 (2021); and Zeyu Zhang et al., "Wdrass: A web-scale dataset for document retrieval and answer sentence selection", in Proceedings of the 31st ACM International Conference on Information and Knowledge Management, CIKM '22, p. 4707-4711. Association for Computing Machinery (2022) (hereby incorporated by reference in their entireties)). In particular, (i) WikiQA (see Yi Yang et al., "Wikiqa: A challenge dataset for open-domain question answering", in Proceedings of EMNLP (2015) (hereby incorporated by reference in its entirety)) was used, consisting of questions from Bing query logs and manually annotated answers from Wikipedia, along with (ii) WDRASS (see Zeyu Zhang et al., "Wdrass: A web-scale dataset for document retrieval and answer sentence selection", in Proceedings of the 31st ACM International Conference on Information and Knowledge Management, CIKM '22, p. 4707-4711. Association for Computing Machinery (2022) (hereby incorporated by reference in its entirety)), a larges-cale web-based dataset having factoid and non-factoid questions, to investigate retrieval performance. The same train/dev/test splits were used as in previous work.

A small portion of the WikiQA training data was used to tune hyperparameters for the model and select the best hyper-parameters for all the datasets, as disclosed in Ivano Lauriola and Alessandro Moschitti, "Answer sentence selection using local and global context in transformer models", in Proceedings of ECIR, pp. 298-312 (2021) (hereby incorporated by reference in its entirety). Adam optimizer was employed to train the model with a learning rate of 1e-5 and a batch size of 64. 400 was set for the hidden vector sizes for all the feed-forward networks, L=2 for the number of the GCN layers, and 0.3 for the trade-off weights $\gamma$. Performance of the models are averaged over three random runs.

The herein disclosed model was compared with TANDA (see Siddhant Garg et al., "Tanda: Transfer and adapt pre-trained transformer models for answer sentence selection", Proceedings of AAAI, 34 (05), 7780-7788 (April 2020) (hereby incorporated by reference in its entirety)) and LOCT (see Ivano Lauriola and Alessandro Moschitti, "Answer sentence selection using local and global context in trans-former models", in Proceedings of ECIR, pp. 298-312 (2021) (hereby incorporated by reference in its entirety)), which are the current state-of-the-art models for AS2. Table 1 shows the performance comparison between the models on two settings: i) using a non-finetuned ROBERTa-Base encoder, and ii) using a finetuned ROBERTa-Base encoder. The non-finetuned ROBERTa-Base was obtained from Yin-han Liu et al., "Roberta: A robustly optimized bert pretrain-ing approach', arXiv preprint arXiv: 1907.11692, (2019) (hereby incorporated by reference in its entirety), while the other was produced by fine-tuning TANDA on the ASNQ dataset (see Siddhant Garg et al., "Tanda: Transfer and adapt pre-trained transformer models for answer sentence selec-tion", Proceedings of AAAI, 34 (05), 7780-7788 (April 2020) (hereby incorporated by reference in its entirety)). As can be seen from Table 1, all the models benefit from using the finetuned ROBERTa-Base encoder with ASNQ. Across the two settings, the herein disclosed model outperformed the previous models by large margins, demonstrating its effectiveness for AS2.

TABLE 1

Performance comparison on WikiQA dev and test, *indicates results reported in Ivano Lauriola and Alessandro Moschitti, "Answer sentence selection using local and global context in transformer models', in Proceedings of ECIR, pp. 298-312, (2021).

| Models | w/o ASNQ | | with ASNQ | |
| | P@1 | MAP | P@1 | MAP |
| --- | --- | --- | --- | --- |
| TANDA | 63.24* | 75.00* | 78.67* | 86.74* |
| LOCT | 68.09* | 79.00* | 81.31* | 88.00* |
| Knowledge Retriever of Present Disclosure | 74.16 | 83.29 | 83.77 | 89.28 |

TABLE 2

Performance comparison on WDRASS test set.

| Models | with ASNQ | | |
| | P@1 | MAP | MRR |
| --- | --- | --- | --- |
| TANDA | 54.6 | 63.5 | 64.3 |
| Knowledge Retriever of Present Disclosure | 55.9 | 61.8 | 69.7 |
| Joint Knowledge Retriever of Present Disclosure | 55.9 | 64.2 | 65.0 |

In Table 2, the performance of the herein disclosed model compared to TANDA on the WDRASS test set is shown. As can be seen, the knowledge retriever component of the present disclosure significantly improves the performance for P@1 and MRR scores, however, decreases the perfor-mance for MAP score. This is attributed to the fact that questions in the WDRASS dataset usually have more than 1 correct answer for a single question while the herein dis-closed model is configured, in some embodiments, to rank answer candidates individually. To deal with this issue, another use case of the herein disclosed model was explored where it can jointly rerank multiple answer candidates based on top K=3 candidates ranked by TANDA. As shown in Table 2, the joint version of the herein disclosed knowledge retriever component performed a better
reranking for TANDA, leading to significantly better per-formance for all the three metrics. These results further validate the effectiveness of the herein disclosed knowledge retriever component design for AS2.

Example 2. End-to-End Evaluation for
Feedback-Based Learning for Knowledge-Aware
Answer Generation (FLAG)

In this section, the herein disclosed reinforcement learn-ing from human feedback system FLAG for open domain QA in an end-to-end fashion is evaluated. Particularly, given a question, the knowledge retriever component first obtained relevant facts for the question, based on which the answer generator produced a final response.

The performance of the end-to-end QA system was evalu-ated using accuracy metrics (i.e., the percentage of questions that were answered satisfactorily). A satisfactory (i.e., good) answer was defined as one that must not only be factually accurate, but also expressed in a natural, fluent, and direct manner to the question. Answers that were too verbose or oddly phrased were considered unsatisfactory (i.e., bad).

As the evaluation was done by human experts, an evaluation set was created by randomly sampling 2000 unlabeled questions from the test set of the MS Marco QA NLG corpus (see Tri Nguyen et al., "Ms marco: A human generated machine reading comprehension dataset", choice, (November 2016) (hereby incorporated by reference in its entirety)). Each question was associated with ten most relevant passages, from which sentence segmentation was performed and the knowledge retriever was applied to obtain top K=5 facts (i.e., answer sentence candidates), i.e., context c, for the question. In addition, another set of 2000 unlabeled questions was randomly sampled from the development set of the MS Marco QA NLG for system development purpose.

To speed up the experiments, pretrained large version of T5 (see Colin Raffel et al., "Exploring the limits of transfer learning with a unified text-to-text transformer", The Journal of Machine Learning Research, 21 (1), 5485-5551 (2020) (hereby incorporated by reference in its entirety)) was employed for the answer generator and the hyper-parameters were tuned on the created development set. Specifically, the models were trained with Adam optimizer, a learning rate of 5e-5, batch size of 256, a Kullback-Leibler coefficient $\beta=0.05$ and a scaling factor $\lambda=10$ for the reward. For the other PPO hyper-parameters, Daniel M Ziegler et al., "Fine-tuning language models from human preferences", arXiv preprint arXiv: 1909.08593 (2019) (hereby incorporated by reference in its entirety) was followed to set the same values for the experiment. Pytorch version 1.12.1 and Huggingface Transformers version 4.26.0 were used to implement the models and run experiments on a single NVIDIA A100 SXM4 40 GB.

TABLE 3

Performance of the models on 2000 questions in MS Marco QA NLG test set. The human-evaluated accuracy increases as the average expected reward increases.

| Systems | Expected Reward | Accuracy |
|---|---|---|
| KR-top-5 | 4.6 | 47.7 |
| KR-top-4 | 5.0 | 48.8 |
| KR-top-3 | 5.6 | 51.8 |
| KR-top-2 | 6.2 | 55.8 |
| KR-top-1 | 6.7 | 59.6 |
| SFT-single-770M | 5.7 | 57.0 |
| SFT-multi-770M | 7.1 | 67.4 |
| SFT-multi-3B | 7.1 | 68.4 |
| FLAG | 8.4 | 71.3 |
| Oracle | — | 72.4 |

The following baselines were compared with the herein disclosed reinforcement learning from human feedback system for ODQA:

KR-top-k: this baseline is the herein disclosed knowledge retriever but only returns a response as the single k-th-ranked answer candidate for a given question.

SFT-multi: this baseline takes the top K=5 answer candidates returned by the herein disclosed knowledge retriever to generate an answer. The answer generator was obtained by following the herein disclosed multi-step finetuning approach.

SFT-single: this baseline is the same as SFT-multi, however, the answer generator was finetuned only once on the combination of all the datasets used by SFT-multi.

FLAG: the herein disclosed reinforcement learning from human feedback system for open domain QA, trained according to FIGS. 1, 2, and 4.

Oracle: this is a baseline, where human experts perfectly select the correct answer among the top 5 answer candidates returned by the herein disclosed knowledge retriever.

Table 3 shows the performance of the models on 2,000 questions sampled from the test set of the MS Marco QA NLG corpus. As can be seen from Table 3, the human-evaluated performance of the models increased as the AS2 reward increased in most cases, demonstrating the representation of the AS2 reward for the human judgement. In addition, SFT-multi obtained significant improvement compared to SFT-single, showing the effectiveness of the herein disclosed multi-step supervised finetuning for open domain QA. The herein disclosed reinforcement learning from human feedback system FLAG achieved the best performance, outperforming all the baselines, even better than the supervised-finetuned "SFT-multi-3B" using a larger generative LLM with 3 billion parameters (see Jason Wei et al., "Finetuned language models are zero-shot learners", in ICLR, (2022) (hereby incorporated by reference in its entirety)). Finally, the herein disclosed model brought a close-to-expert performance for open domain QA, which is only about 1% lower than the oracle. These results illustrate the benefit of the herein disclosed reinforcement learning from human feedback training method for open domain QA.

Figure 10:
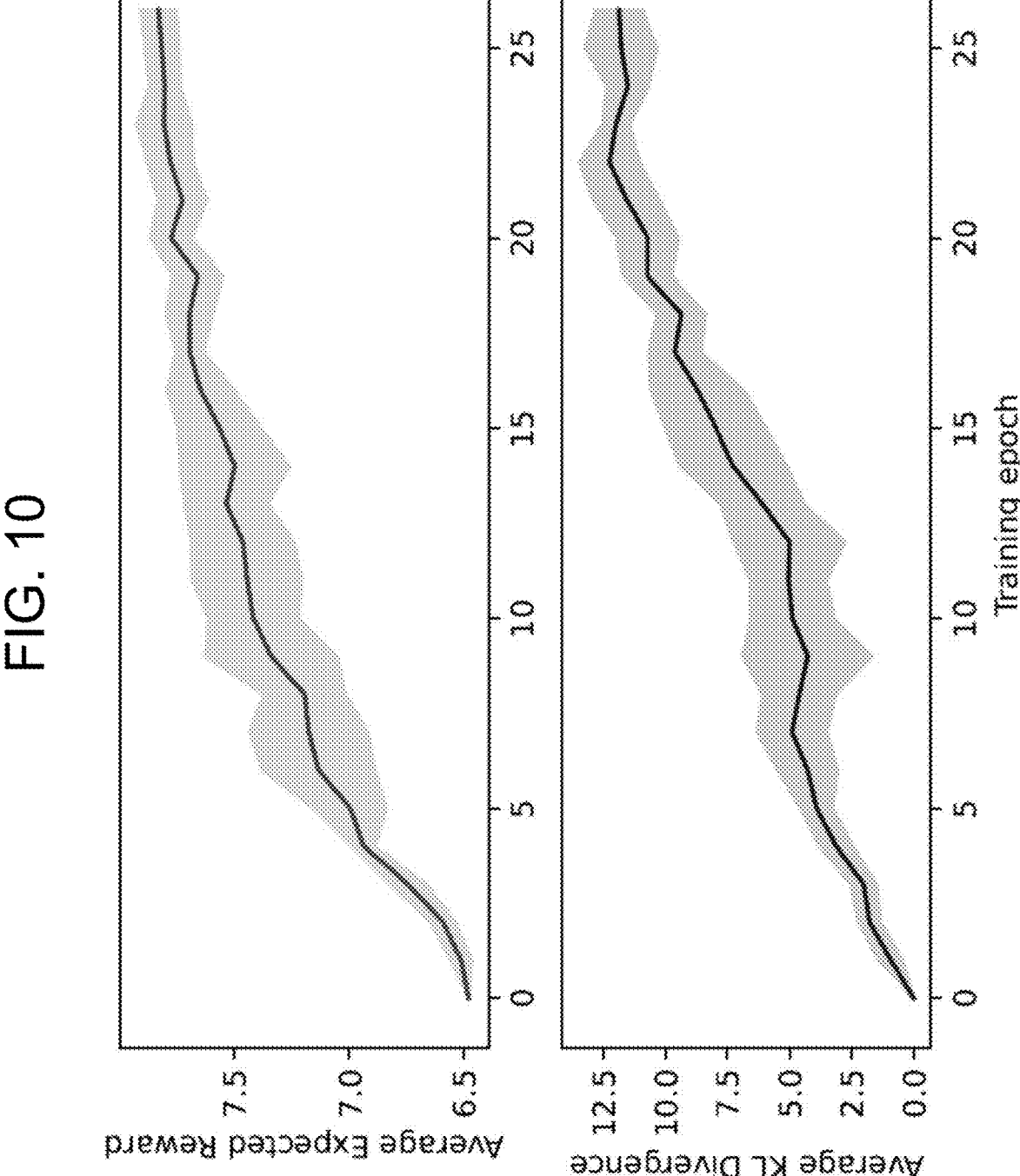
FIG. 10 are charts illustrating average expected reward and Kullback-Leibler divergence on development data for reinforcement learning from human feedback policies during training, according to embodiments of the present disclosure.

To understand the effect of the herein disclosed reinforcement learning from human feedback training, FIG. 10 shows the training curves for the average expected reward and Kullback-Leibler divergence for the reinforcement learning from human feedback policies $$f_\phi^{RL}$$

compared to the initial policy $$f_\theta^{RSFTL}$$

on the development data. As can be seen in FIG. 10, the expected reward escalates gradually and so does the Kullback-Leibler divergence between the new policies and the initial policy over the training. This suggests that the herein disclosed reinforcement learning from human feedback policies provide more satisfactory responses while also exploring during the training, further validating the contribution of the reinforcement learning from human feedback training to the performance of the herein disclosed system for open domain QA.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving a first question;
using a trained model configured to determine context data usable to answer questions, determining first context data usable to answer the first question, wherein the trained model determines the first context data using at least one of a knowledge base and web searching;
using a first finetuned large language model (LLM), processing the first question and the first context data to determine a first answer to the first question, wherein the first finetuned LLM is configured by:
receiving a trained LLM;

creating a first training set comprising pairs of questions and corresponding context data, wherein the pairs comprise:
a first pair comprising a second question and second context data for answering the second question, and
a second pair comprising a third question and third context data for answering the third question;
training the trained LLM in a first stage using the first training set to generate an intermediary-tuned LLM;
creating a second training set comprising the questions without the corresponding context data; and
training the intermediary-tuned LLM in a second stage using the second training set to generate the first finetuned LLM, thereby configuring the first finetuned LLM to use model parameters to produce answers to questions when context data is unavailable; and
outputting the first answer.

2. The computer-implemented method of claim 1, further comprising:
receiving a fourth question;
using the first finetuned LLM, processing the fourth question to determine a second answer to the fourth question;
receiving user feedback indicating a correctness of the second answer; and
generating the trained model using the second answer and the user feedback.

3. The computer-implemented method of claim 1, further comprising:
receiving a fourth question;
using the trained model, determining fourth context data usable to answer the fourth question, wherein the trained model determines the fourth context data using at least one of the knowledge base or web searching;
using the first finetuned LLM, processing the fourth question and the fourth context data to determine a third answer to the fourth question; and
using the fourth question, the fourth context data, and the third answer, generating a second finetuned LLM corresponding to an updated version of the first finetuned LLM.

4. The computer-implemented method of claim 3, further comprising:
using a reward model to generate the second finetuned LLM, wherein the reward model includes a term that penalizes divergence between the trained model and the first finetuned LLM.

5. A computer-implemented method comprising:
receiving a first question;
using a first finetuned large language model (LLM), processing the first question to determine a first answer to the first question, wherein the first finetuned LLM is configured by:
receiving a trained LLM;
creating a first training set comprising pairs of questions and corresponding context data, wherein the pairs comprise:
a first pair comprising a second question and first context data for answering the second question, and
a second pair comprising a third question and second context data for answering the third question;
creating a second training set comprising the questions without the corresponding context data;

training the trained LLM in a first stage using either the first training set or the second training set to generate an intermediary-tuned LLM; and training the intermediary-tuned LLM in a second stage using the other of the first training set or the second training set to generate the first finetuned LLM; and outputting the first answer.

6. The computer-implemented method of claim 5, further comprising:

using a trained model configured to determine context data usable to answer questions, determining third context data usable to answer the first question, wherein the trained model determines the third context data using at least one source different from the trained LLM; and using the first finetuned LLM, further processing the third context data to determine the first answer.

7. The computer-implemented method of claim 6, wherein the at least one source different from the trained LLM comprises at least one of a knowledge base and web searching.

8. The computer-implemented method of claim 6, further comprising:

receiving a fourth question;

using the first finetuned LLM, processing the fourth question to determine a second answer to the fourth question;

receiving user feedback indicating a correctness of the second answer; and generating the trained model using the second answer and the user feedback.

9. The computer-implemented method of claim 6, further comprising:

receiving a fourth question;

using the trained model, determining third context data usable to answer the fourth question;

using the first finetuned LLM, processing the fourth question and the third context data to determine a second answer to the fourth question; and using the fourth question, the third context data, and the second answer, generating a second finetuned LLM corresponding to an updated version of the first finetuned LLM.

10. The computer-implemented method of claim 9, further comprising:

using a reward model to generate the second finetuned LLM, wherein the reward model includes a term that penalizes divergence between the trained model and the first finetuned LLM.

11. The computer-implemented method of claim 5, wherein the trained LLM is an encoder-decoder LLM.

12. The computer-implemented method of claim 5, wherein the first finetuned LLM is configured by:

training the trained LLM in the first stage using the first training set to generate the intermediary-tuned LLM; and training the intermediary-tuned LLM in the second stage using the second training set to generate the first finetuned LLM.

13. A computing system comprising:

at least one processor; and at least one memory comprising instructions that, when executed by the at least one processor, cause the computing system to:

receive a first question;

use a first finetuned large language model (LLM), processing the first question to determine a first answer to the first question, wherein the first finetuned LLM is configured by:

receiving a trained LLM;

creating a first training set comprising pairs of questions and corresponding context data, wherein the pairs comprise:

a first pair comprising a second question and first context data for answering the second question, and a second pair comprising a third question and second context data for answering the third question;

creating a second training set comprising the questions without the corresponding context data;

training the trained LLM in a first stage using either the first training set or the second training set to generate an intermediary-tuned LLM; and training the intermediary-tuned LLM in a second stage using the other of the first training set or the second training set to generate the first finetuned LLM; and output the first answer.

14. The computing system of claim 13, wherein the at least one memory further comprises instruction that, when executed by the at least one processor, further cause the computing system to:

use a trained model configured to determine context data usable to answer questions, determining third context data usable to answer the first question, wherein the trained model determines the third context data using at least one source different from the trained LLM; and use the first finetuned LLM, further processing the third context data to determine the first answer.

15. The computing system of claim 14, wherein the at least one source different from the trained LLM comprises at least one of a knowledge base and web searching.

16. The computing system of claim 14, wherein the at least one memory further comprises instruction that, when executed by the at least one processor, further cause the computing system to:

receive a fourth question;

use the first finetuned LLM, processing the fourth question to determine a second answer to the fourth question;

receive user feedback indicating a correctness of the second answer; and generate the trained model using the second answer and the user feedback.

17. The computing system of claim 14, wherein the at least one memory further comprises instruction that, when executed by the at least one processor, further cause the computing system to:

receive a fourth question;

use the trained model, determining third context data usable to answer the fourth question;

use the first finetuned LLM, processing the fourth question and the third context data to determine a second answer to the fourth question; and use the fourth question, the third context data, and the second answer, generating a second finetuned LLM corresponding to an updated version of the first finetuned LLM.

18. The computing system of claim 17, wherein the at least one memory further comprises instruction that, when executed by the at least one processor, further cause the computing system to:

use a reward model to generate the second finetuned LLM, wherein the reward model includes a term that penalizes divergence between the trained model and the first finetuned LLM.

19. The computing system of claim 13, wherein the trained LLM is an encoder-decoder LLM.

20. The computing system of claim 13, wherein the first finetuned LLM is configured by:

training the trained LLM in the first stage using the first training set to generate the intermediary-tuned LLM; and training the intermediary-tuned LLM in the second stage using the second training set to generate the first finetuned LLM.

* * * * *